United States Patent
Inata et al.

(10) Patent No.: US 11,109,076 B2
(45) Date of Patent: Aug. 31, 2021

(54) IMAGE TRANSMISSION DEVICE, IMAGE TRANSMISSION METHOD, IMAGE RECEPTION DEVICE, AND IMAGE RECEPTION METHOD

(71) Applicant: MAXELL, LTD., Kyoto (JP)

(72) Inventors: Keisuke Inata, Tokyo (JP); Nobuaki Kabuto, Tokyo (JP); Hironori Komi, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/869,822

(22) Filed: May 8, 2020

(65) Prior Publication Data

US 2020/0267424 A1 Aug. 20, 2020

Related U.S. Application Data

(63) Continuation of application No. 16/151,573, filed on Oct. 4, 2018, now Pat. No. 10,805,648, which is a (Continued)

(51) Int. Cl.
*H04N 21/2343* (2011.01)
*H04N 21/4363* (2011.01)
(Continued)

(52) U.S. Cl.
CPC ......... *H04N 21/2343* (2013.01); *G09G 5/006* (2013.01); *H04N 21/43632* (2013.01);
(Continued)

(58) Field of Classification Search
CPC ........... G09G 2340/02; G09G 2350/00; G09G 2370/047; G09G 2370/10; G09G 2370/12;
(Continued)

(56) References Cited

U.S. PATENT DOCUMENTS 5,754,255 A 5/1998 Takamori
6,654,544 B1 11/2003 Suzuki et al.
(Continued)

FOREIGN PATENT DOCUMENTS

EP 0690630 A2 1/1996
JP 02-15791 A 1/1990
(Continued)

OTHER PUBLICATIONS

Hitachi et al., High-Definition Multimedia Interface Specification Version 1.4a, Mar. 4, 2010 (Year: 2010).*
(Continued)

*Primary Examiner* — Francis Geroleo
(74) *Attorney, Agent, or Firm* — Mattingly & Malur, PC

(57) ABSTRACT

In prior art documents, no consideration is given as to how to more faithfully preserve image (here and subsequently also termed "video") data of larger size during transmission. Provided is an image transmission device for transmission of image data, characterized by having a compression processor for compressing image data, and an output section for outputting compressed data having been compressed by the compression processor, the output section outputting the compressed data separately during a first interval and a second interval different from the first interval.

4 Claims, 29 Drawing Sheets

Related U.S. Application Data continuation of application No. 14/360,312, filed as application No. PCT/JP2011/006554 on Nov. 25, 2011, now Pat. No. 10,136,127.

(51) Int. Cl.
  *G09G 5/00* (2006.01)
  *H04N 21/442* (2011.01)
  *H04N 21/6379* (2011.01)
  *H04N 7/083* (2006.01)

(52) U.S. Cl.
  CPC . *H04N 21/43635* (2013.01); *H04N 21/44209* (2013.01); *H04N 21/6379* (2013.01); *G09G 2340/02* (2013.01); *G09G 2350/00* (2013.01); *G09G 2370/047* (2013.01); *G09G 2370/10* (2013.01); *G09G 2370/12* (2013.01); *H04N 7/083* (2013.01)

(58) Field of Classification Search
  CPC ............... G09G 5/006; H04N 21/2343; H04N 21/43632; H04N 21/43635; H04N 21/44209; H04N 21/6379; H04N 7/083
  See application file for complete search history.

(56) References Cited

U.S. PATENT DOCUMENTS

| | | | |
|---|---|---|---|
| 6,914,637 B1 | 7/2005 | Wolf et al. | |
| 7,088,398 B1 | 8/2006 | Wolf et al. | |
| 7,143,328 B1 | 11/2006 | Altmann | |
| 7,257,163 B2 | 8/2007 | Hwang et al. | |
| 7,359,437 B2 | 4/2008 | Hwang et al. | |
| 2003/0014705 A1 | 1/2003 | Suzuki et al. | |
| 2003/0085997 A1 | 5/2003 | Takagi et al. | |
| 2005/0163223 A1 | 7/2005 | Klamer et al. | |
| 2006/0143335 A1 | 6/2006 | Ramamoorthy et al. | |
| 2010/0073574 A1 | 3/2010 | Nakajima et al. | |
| 2010/0247059 A1* | 9/2010 | Lee | H04N 5/775 386/201 |
| 2010/0271461 A1 | 10/2010 | Takizuka | |
| 2011/0149024 A1 | 6/2011 | Tsukagoshi | |
| 2011/0170614 A1 | 7/2011 | Moriyama et al. | |
| 2011/0285818 A1* | 11/2011 | Park | H04N 13/194 348/43 |
| 2011/0304522 A1 | 12/2011 | Zeng | |
| 2012/0011596 A1 | 1/2012 | Kim et al. | |
| 2013/0083837 A1 | 4/2013 | Heng | |

FOREIGN PATENT DOCUMENTS

| | | |
|---|---|---|
| JP | 07-327227 A | 12/1995 |
| JP | 2005-514873 A | 5/2005 |
| JP | 2009-213110 A | 9/2009 |

OTHER PUBLICATIONS

Extended European Search Report, dated Oct. 22, 2015, which issued during the prosecution of European Patent Application No. 11876114.7.

Notification for Reasons for Refusal, dated Dec. 27, 2016, which issued during the prosecution of Japanese Patent Application No. 2016-000836 (English translation attached).

* cited by examiner

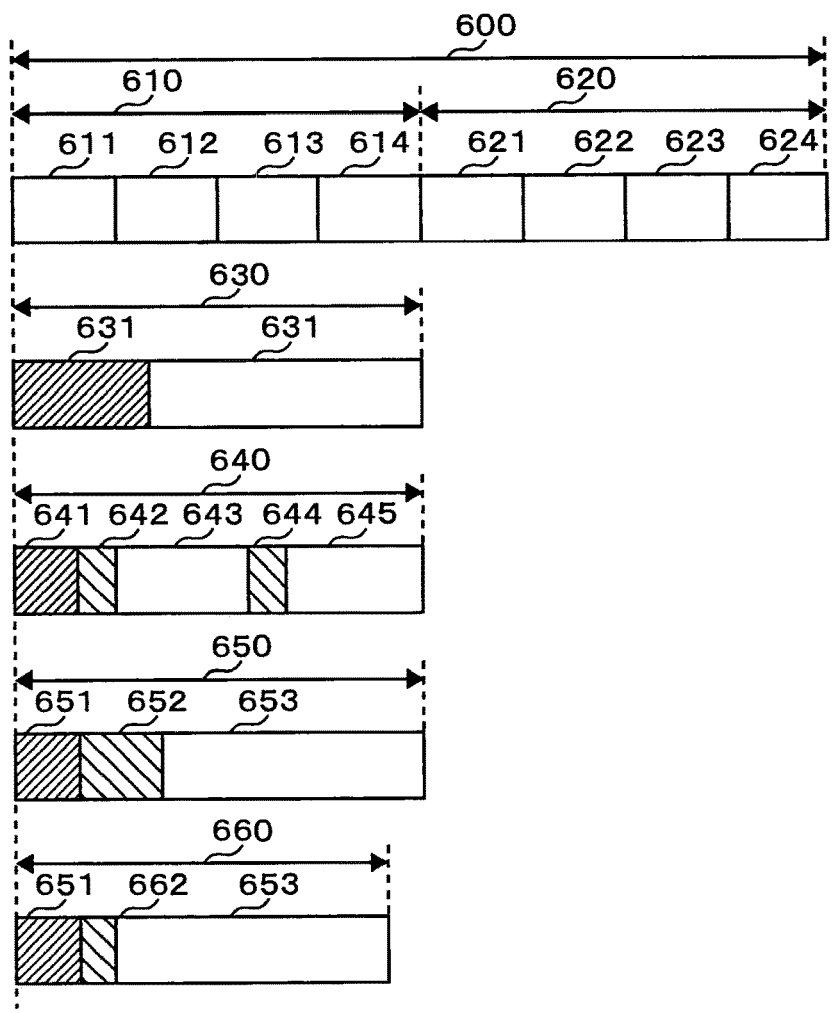

FIG. 14

| Bit<br>Byte# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | 0 | 0 | 0 | 0 | 0 |
| HB2 | 0 | 0 | 0 | 0 | Eco_Packet# | | | |

FIG. 15

| Bit<br>Byte# | 7 | 6 | 5 | 4 | 3 | 2 | 1 | 0 |
|---|---|---|---|---|---|---|---|---|
| PB0 | CD | | | | Eco_Mem | Eco_Sample | | |
| PB1 | 0 | 0 | 0 | 0 | Eco_FLM | Eco_CbCr | | |
| PB2 | 0 | | | | | | | |
| PB3 | 0 | | | | | | | |
| PB4 | CK_N | | | | CK_M | | | |
| PB5 | Eco_Block | | | | | | | |
| PB6 | Eco_CD0 | | | | | | | |
| PB7 | Eco_CD1 | | | | | | | |
| PB8 | Eco_CD2 | | | | | | | |
| PB9 | Eco_CD3 | | | | | | | |

FIG. 16

| Bit / Byte# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 0 | 0 | 0 | 0 | 0 | 0 | 0 | 0 |
| HB2 | 0 | 0 | 0 | 0 | Eco_Packet# | | | |

FIG. 17

| Bit / Byte# | 7 | 6 | 5 | 4 | 3 | 2 | 1 | 0 |
|---|---|---|---|---|---|---|---|---|
| PB0 | Eco_length_0 | | | | Eco_length_1 | | | |
| PB1 | Eco_length_0 | | | | Eco_length_1 | | | |
| PB2~PB18 | ... | | | | | | | |
| PB19 | Eco_length_38 | | | | Eco_length_39 | | | |

FIG. 18

| Eco_Code | COMPRESSION CODING INFORMATION |
|---|---|
| 0 | NO INFORMATION |
| 1 | CURTAILMENT 12bit 4:2:2 |
| 2 | CURTAILMENT 10bit 4:2:2 |
| 3 | CURTAILMENT 8bit 4:2:2 |
| 4 | CURTAILMENT 12bit 4:2:0 |
| 5 | CURTAILMENT 10bit 4:2:0 |
| 6 | CURTAILMENT 8bit 4:2:0 |
| 7 | HORIZONTAL COMPRESSION WAVELET CONVERSION |
| 8 | HORIZONTAL COMPRESSION RUN LENGTH ENCODING |
| 9 | HORIZONTAL COMPRESSION HUFFMAN CODING |
| 10 | HORIZONTAL COMPRESSION DELTA ENCODING |
| 11 | VERTICAL COMPRESSION WAVELET CONVERSION |
| 12 | VERTICAL COMPRESSION RUN LENGTH ENCODING |
| 13 | VERTICAL COMPRESSION HUFFMAN CODING |
| 14 | VERTICAL COMPRESSION DELTA ENCODING |
| 15~ | RESERVED(FOR FUTURE EXPANSION) |

| Bit / Byte# | 7 | 6 | 5 | 4 | 3 | 2 | 1 | 0 |
|---|---|---|---|---|---|---|---|---|
| 0 | Vender-specific tag code (=3) | | | | Length (=9) | | | |
| 1,2,3 | 24-bit IEEE Registration Identifier (0x00C03) | | | | | | | |
| 4 | A | | | | B | | | |
| 5 | C | | | | D | | | |
| 6 | Supports_AI | DC_48bit | DC_48bit | DC_30bit | DC_Y444 | Eco_transfer | Rsvd (0) | DVI_Dual |
| 7 | Max_TMDS_Clock | | | | | | | |
| 8 | 0 | 0 | 0 | 0 | 0 | 0 | 0 | 0 |
| 9 | Eco_Code4 | Eco_Code3 | Eco_Code2 | Eco_Code1 | Block_128 | Block_64 | Eco_Mem | |
| 10 | CLK_1 | CLK_3/4 | CLK_1/2 | Rsvd (0) | Eco_Error_1 | Eco_Error_2 | Eco_Error_3 | Eco_Error_4 |

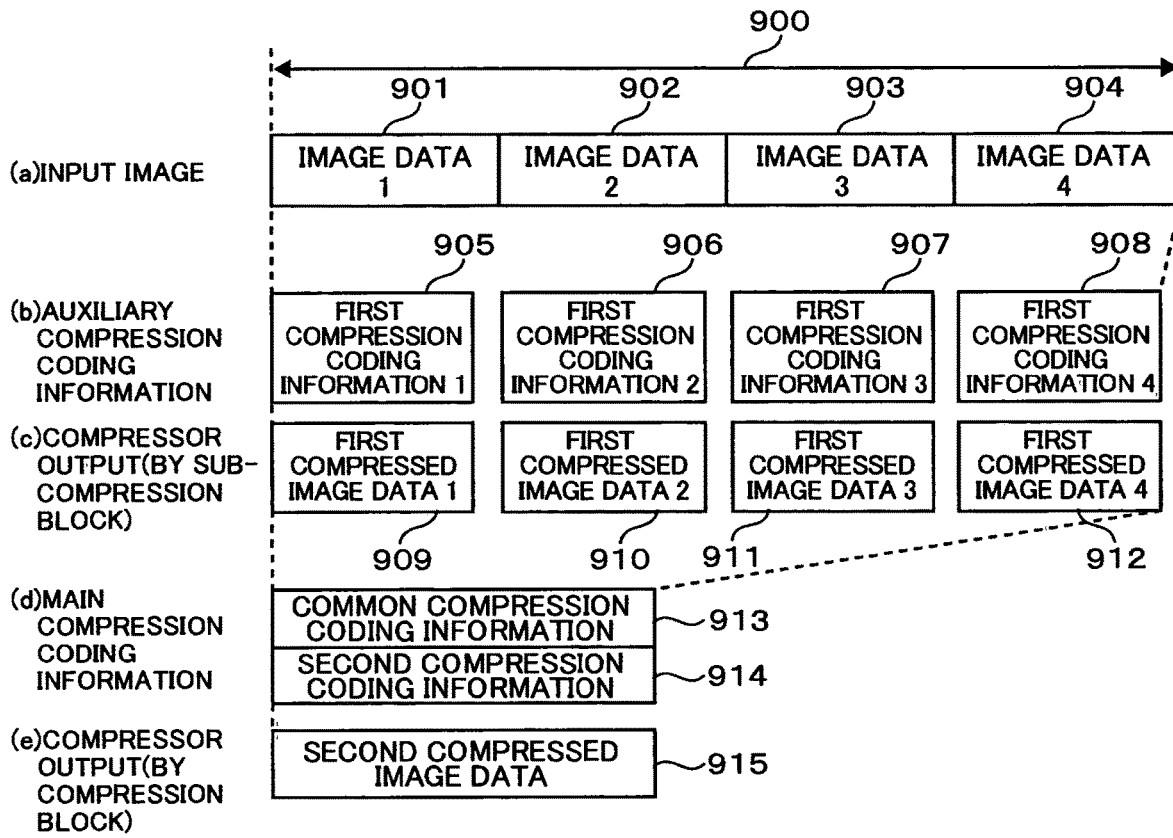
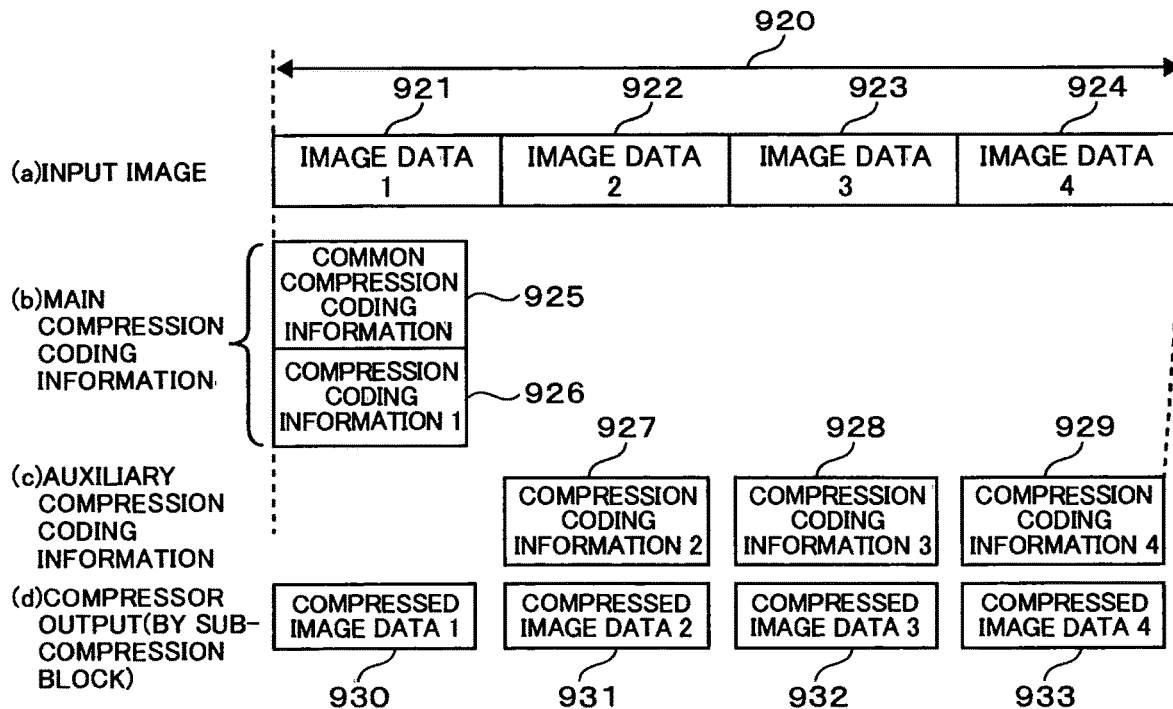

F I G. 3 0
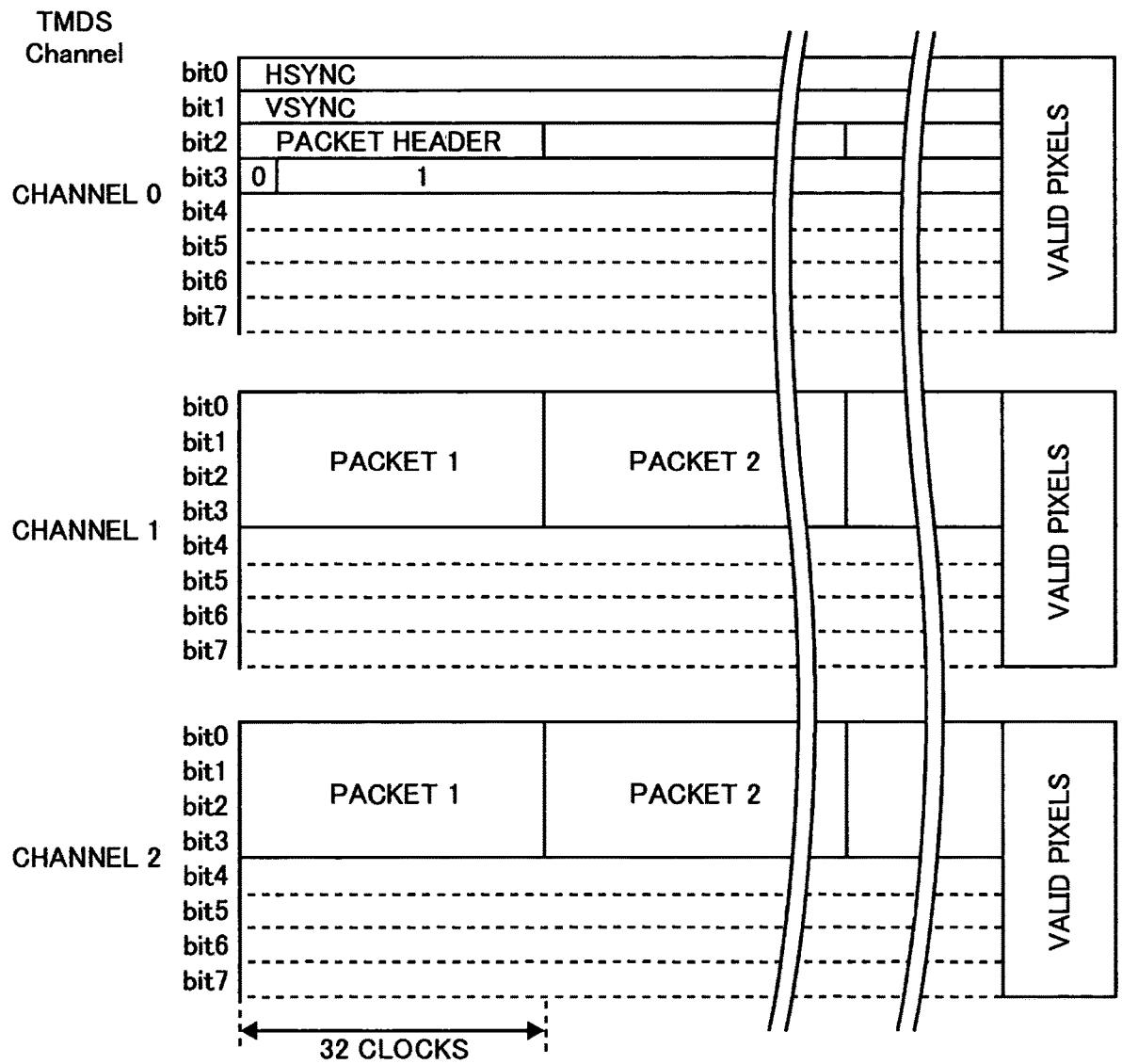

F I G. 3 6
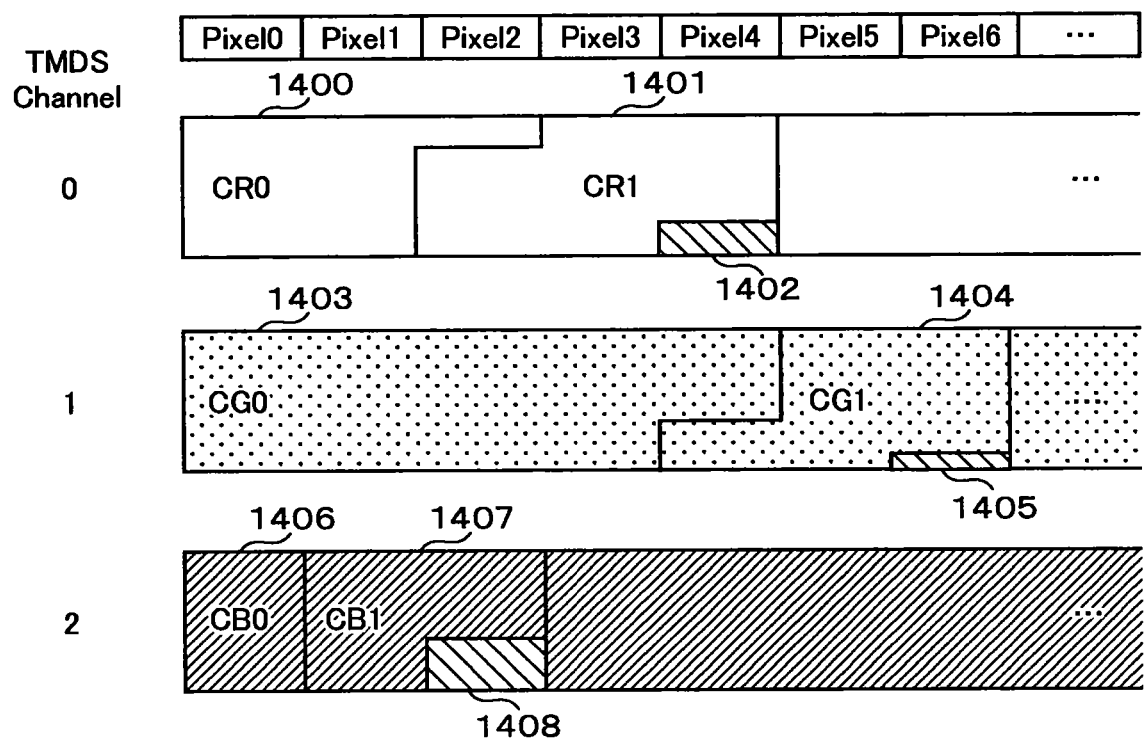

F I G. 3 8
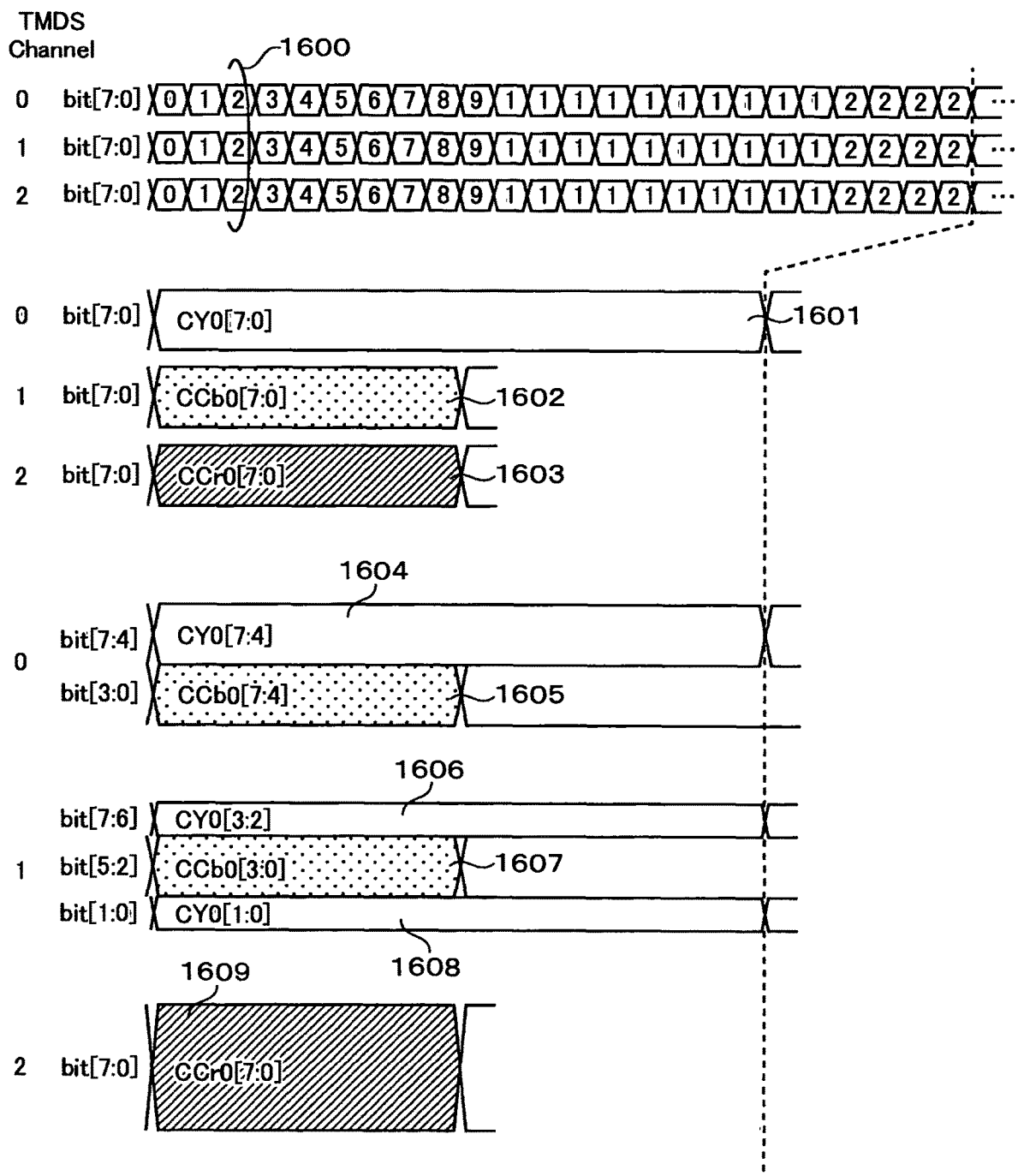

FIG. 43

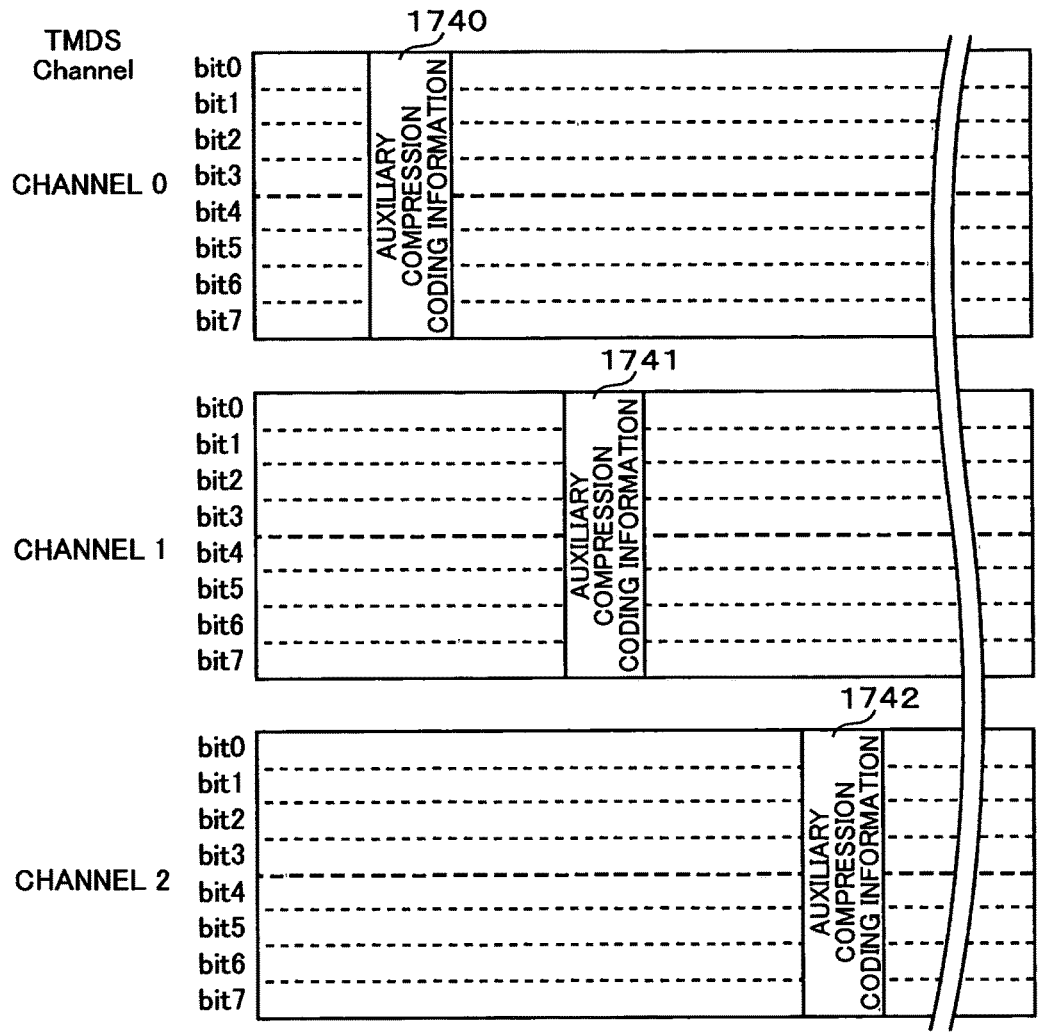

FIG. 44

| # | TRANSMISSION ERROR RATE (ER) | COMPRESSION RATE (COMPRESSED IMAGE DATA/ IMAGE DATA) | HORIZONTAL BLANKING PERIOD | REDUNDANCY LEVEL |
|---|---|---|---|---|
| 1 | ER>ERa | 40% | SHORTENED(a) | MAIN COMPRESSION CODING INFORMATION 0 AUXILIARY COMPRESSION CODING INFORMATION 2 |
| 2 | ERb<ER≦ERa | 60% | SHORTENED(b) | MAIN COMPRESSION CODING INFORMATION 0 AUXILIARY COMPRESSION CODING INFORMATION 1 |
| 3 | ER≦ERb | 80% | SHORTENED(c) | MAIN COMPRESSION CODING INFORMATION 0 AUXILIARY COMPRESSION CODING INFORMATION 0 |

F I G. 4 5

| # | TRANSMISSION ERROR RATE (ER) | COMPRESSION RATE (COMPRESSED IMAGE DATA/ IMAGE DATA) | HORIZONTAL BLANKING PERIOD | REDUNDANCY LEVEL |
|---|---|---|---|---|
| 1 | ER>ERa | 40% | EXTENDED | MAIN COMPRESSION CODING INFORMATION 1<br>AUXILIARY COMPRESSION CODING INFORMATION1 |
| 2 | ERb<ER≦ERa | 60% | SHORTENED(b) | MAIN COMPRESSION CODING INFORMATION 0<br>AUXILIARY COMPRESSION CODING INFORMATION 1 |
| 3 | ER≦ERb | 80% | SHORTENED(c) | MAIN COMPRESSION CODING INFORMATION 0<br>AUXILIARY COMPRESSION CODING INFORMATION 0 |

F I G. 4 6

| # | TRANSMISSION ERROR RATE (ER) | COMPRESSION FORMULA | HORIZONTAL BLANKING PERIOD | REDUNDANCY LEVEL |
|---|---|---|---|---|
| 1 | ER>ERa | FORMULA A | EXTENDED | MAIN COMPRESSION CODING INFORMATION 1<br>AUXILIARY COMPRESSION CODING INFORMATION1 |
| 2 | ERb<ER≦ERa | FORMULA B | SHORTENED(b) | MAIN COMPRESSION CODING INFORMATION 0<br>AUXILIARY COMPRESSION CODING INFORMATION 1 |
| 3 | ER≦ERb | FORMULA C | SHORTENED(c) | MAIN COMPRESSION CODING INFORMATION 0<br>AUXILIARY COMPRESSION CODING INFORMATION 0 |

FIG. 47

| # | CONTENTS | COMPRESSION RATE (COMPRESSED IMAGE DATA/ IMAGE DATA) | HORIZONTAL BLANKING PERIOD | REDUNDANCY LEVEL |
|---|---|---|---|---|
| 1 | MOVIE | 80% | EXTENDED | MAIN COMPRESSION CODING INFORMATION 2<br>AUXILIARY COMPRESSION CODING INFORMATION 1 |
| 2 | SPORTS | 80% | SHORTENED(c) | MAIN COMPRESSION CODING INFORMATION 0<br>AUXILIARY COMPRESSION CODING INFORMATION 0 |
| 3 | JAPANESE CHECKER/ JAPANESE CHESS | 40% | SHORTENED(a) | MAIN COMPRESSION CODING INFORMATION 1<br>AUXILIARY COMPRESSION CODING INFORMATION 1 |
| 4 | OTHERS | 60% | SHORTENED(b) | MAIN COMPRESSION CODING INFORMATION 0<br>AUXILIARY COMPRESSION CODING INFORMATION 0 |

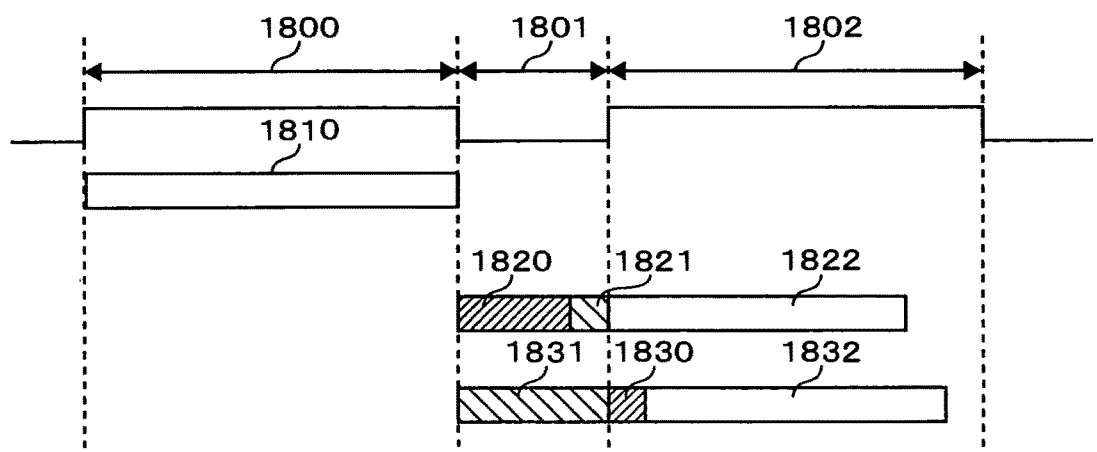

FIG. 48

F I G. 4 9
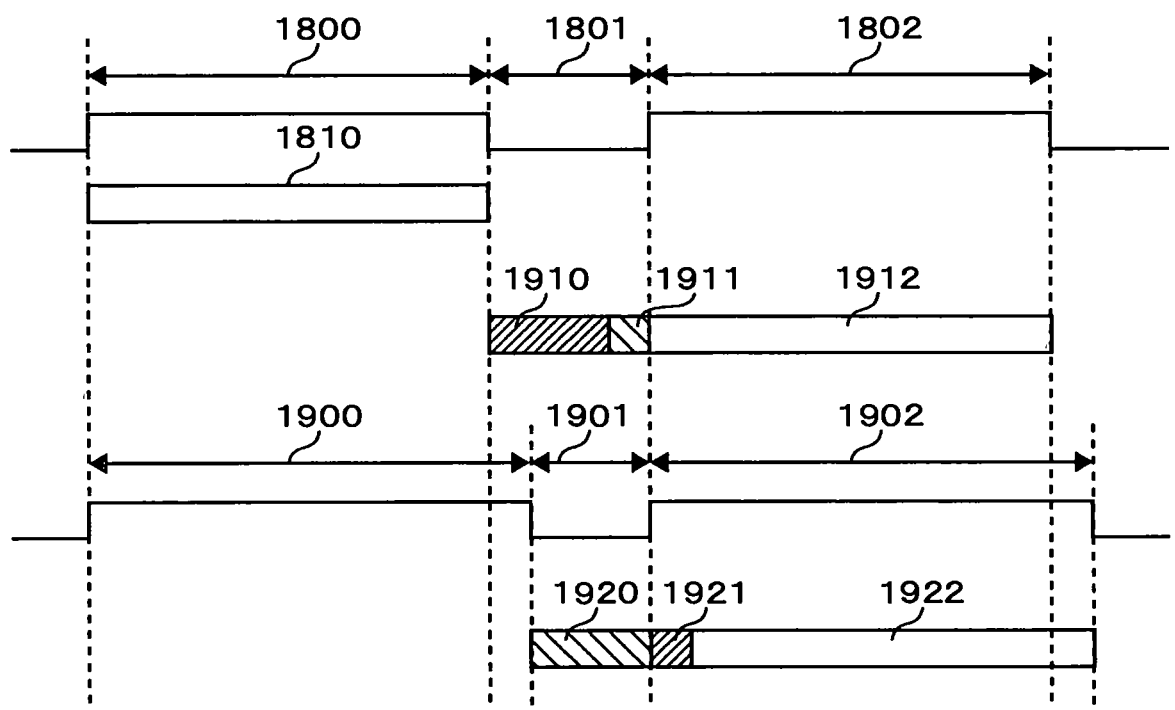

IMAGE TRANSMISSION DEVICE, IMAGE TRANSMISSION METHOD, IMAGE RECEPTION DEVICE, AND IMAGE RECEPTION METHOD

CROSS REFERENCE TO PRIOR APPLICATIONS

This application is a continuation of U.S. patent application Ser. No. 16/151,573, filed Oct. 4, 2018, which is a continuation of U.S. patent application Ser. No. 14/360,312, filed on Jun. 16, 2014, now U.S. Pat. No. 10,136,127, which is a U.S. National Phase application under 35 U.S.C. § 371 of International Application No. PCT/JP2011/006554, filed on Nov. 25, 2011. The International Application was published in Japanese on May 30, 2013 as WO 2013/076777 A1 under PCT Article 21(2). The contents of the above applications are hereby incorporated by reference.

TECHNICAL FIELD

The technical field relates to transmission and reception of image information.

BACKGROUND ART

In recent times, the number of pixels handled by digital image processing is increasing from year to year in connection with the adoption of 4 k2 k (3840×2160 pixels) for displays for general users, HD (High Definition: 1920×1080 pixels) for broadcasting and high pixel capacities for image sensors and displays of digital video cameras.

Regarding formulas of transmitting such image data between equipment units, there are the HDMI (High-Definition Multimedia Interface (registered trademark of HDMI Licensing, LLC) standards and DisplayPort (registered trademark or trademark of VESA) standards formulated by VESA (Video Electronics Standards Association).

Regarding the aforementioned HDMI data transmission formula, Patent Literature 1 states that it is "to selectively transmit uncompressed image signals or compressed image signals obtained by subjecting these uncompressed image signals to compression processing by a compression formula compatible with the receiver device, and permits satisfactory transmission of image signals at a desired bit rate within the transmission bit rate range of the transmission path" (see [0048] in Patent Literature 1) and, regarding the compression formula, "the data compressors 121-1 to 121-*n* process compression, at a prescribed compression rate, of uncompressed image signals outputted from the codec 117 and outputs compressed image signals. The data compressors 121-1 to 121-*n* constitute an image signal compressing unit. Each of the data compressors 121-1 to 121-*n* processes data compression by a different compression formula from all the others. For instance, it is stated that, as compression formulas, "'RLE (Run Length Encoding)', 'Wavelet', 'SBM (Super Bit Mapping (trademark of Sony))', 'LLVC (Low Latency Video Codec)', 'ZIP' and so forth are conceivable" (see [0077] in Patent Literature 1).

Further in HDMI, data transmission formats of TMDS (registered trademark of Transition Minimized Differential Signaling (Silicon Image, Inc.)) are used for image data, and Patent Literature 2 is cited as one example.

CITATION LIST

Patent Literature

Patent Literature 1: Japanese Patent Application Laid-Open No. 2009-213110

Patent Literature 2: Japanese Unexamined Patent Application Publication (Translation of PCT Application) No. 2005-514873

Technical Problem

However, in any of the cited prior literature, no consideration is given to transmissions of images (sometimes referred to as "pictures"; the same applies hereinafter) of larger sizes while keeping the data more faithfully.

Solution to Problem

To solve the problem noted above, for instance configurations described in the Claims are used.

Advantageous Effects of Invention

Whereas the present application covers a plurality of means to solve the problem, according to one example of the means, there is provided an image transmission device that transmits image data including a compression processor that compresses image data and an output section that outputs compressed image data compressed by the compression processor, wherein the output section outputs the compressed image data divided between a first period and a second period different from the first period.

To cite another example, an image transmission device that transmits image data includes a compression processor that processes compression of image data including a plurality of components, and a data transmission section that outputs the compressed image data, wherein the data transmission section alters the outputting method of image data on the basis of the individual components of the image data.

To cite still another example, an image transmission device that transmits image data includes a compression processor that processes compression of image data and generates compressed image data and compression coding information concerning the compression processing, and a data transmission section that outputs compressed image data and the compression coding information, wherein the redundancy of the compression coding information is greater than the redundancy of the compressed image data.

To cite yet another example, an image transmission device that transmits image data includes a compression processor that processes compression of image data and an compressed by the compression processor, wherein the output section outputs the compressed image data divided between a first period and a second period different from the first period, and the compression processor alters, on the basis of the transmission error rate on a transmission path, compression processing of the image data.

By the means described above, it is made possible to transmission image data of a greater size while keeping the data more faithfully.

BRIEF DESCRIPTION OF DRAWINGS

FIG. 4 shows another example of units of image data to be compressed in the first embodiment.

FIG. 5 shows one example of composition of main compression coding information, auxiliary compression coding information and compressed image data in the first embodiment.

FIG. 14 shows one example of header of a compression coding information packet in the first embodiment.

FIG. 15 shows one example of data of the compression coding information packet in the first embodiment.

FIG. 16 shows another example of header of the compression coding information packet in the first embodiment.

FIG. 17 shows another example of data of the compression coding information packet in the first embodiment.

FIG. 18 shows one example of compression coding information packet in the first embodiment.

FIG. 27 shows one example of compression coding information in the first embodiment.

FIG. 28 shows another example of compression coding information in the first embodiment.

FIG. 30 shows one example of data composition of the serializer output in the second embodiment.

FIG. 36 shows another example of bit allocation to various components of compressed image data on the transmission path in the second embodiment.

FIG. 38 shows another example of bit allocation to various components of compressed image data on the transmission path in the second embodiment.

FIG. 43 shows one example of data composition of auxiliary compression coding information in the third embodiment when the redundancy level is added.

FIG. 44 shows one example of allocation of compression rate, horizontal blanking period and redundancy level relative to the transmission error rate in a fourth embodiment.

FIG. 45 shows another example of allocation of compression rate, horizontal blanking period and redundancy level relative to the transmission error rate in the fourth embodiment.

FIG. 46 shows another example of allocation of compression rate, horizontal blanking period and redundancy level relative to the transmission error rate in the fourth embodiment.

FIG. 47 shows one example of allocation of compression rate, horizontal blanking period and redundancy level relative to the contents in a fifth embodiment.

FIG. 48 shows one example of main compression coding information, auxiliary compression coding information and compressed image data, and transmission timing of audio packet in a sixth embodiment.

FIG. 49 shows another example of main compression coding information, auxiliary compression coding information and compressed image data, and transmission timing of audio packet in the sixth embodiment.

DESCRIPTION OF EMBODIMENTS

Known systems of transmitting image data to minimize the delay time include an uncompressed image data transmission system, but it has involved the problem of requiring a high-transmission path if sending large-size image data is intended. To solve this problem a system of transmitting image data in a compressed form is proposed, but it has its own problem that, once an error arises on the transmission path, displayed images are disturbed in compressed block units, each including a plurality of pixels. There has been another problem that the data quantity that can be transmitted during a blanking period in which high error-resistivity is ensured is smaller than that can be transmitted during a valid pixel period.

In the following embodiments, solution of this problem is attempted by accomplishing data compression in compressed block units in a system of transmitting image data under compression to generate compression coding information and transmitting a more important part of the compression coding information out of the generated compression coding information (hereinafter to be referred to as main compression coding information) in a blanking period in which error-resistivity is higher. To add, other parts of the compression coding information (hereinafter to be referred to as auxiliary compression coding information), like compressed image data, are transmitted during a valid period. These embodiments will be described below with reference to drawings.

Embodiment 1

The modes of materializing image transmission devices and image receiving devices in these embodiments will be described below.

Figure 1:
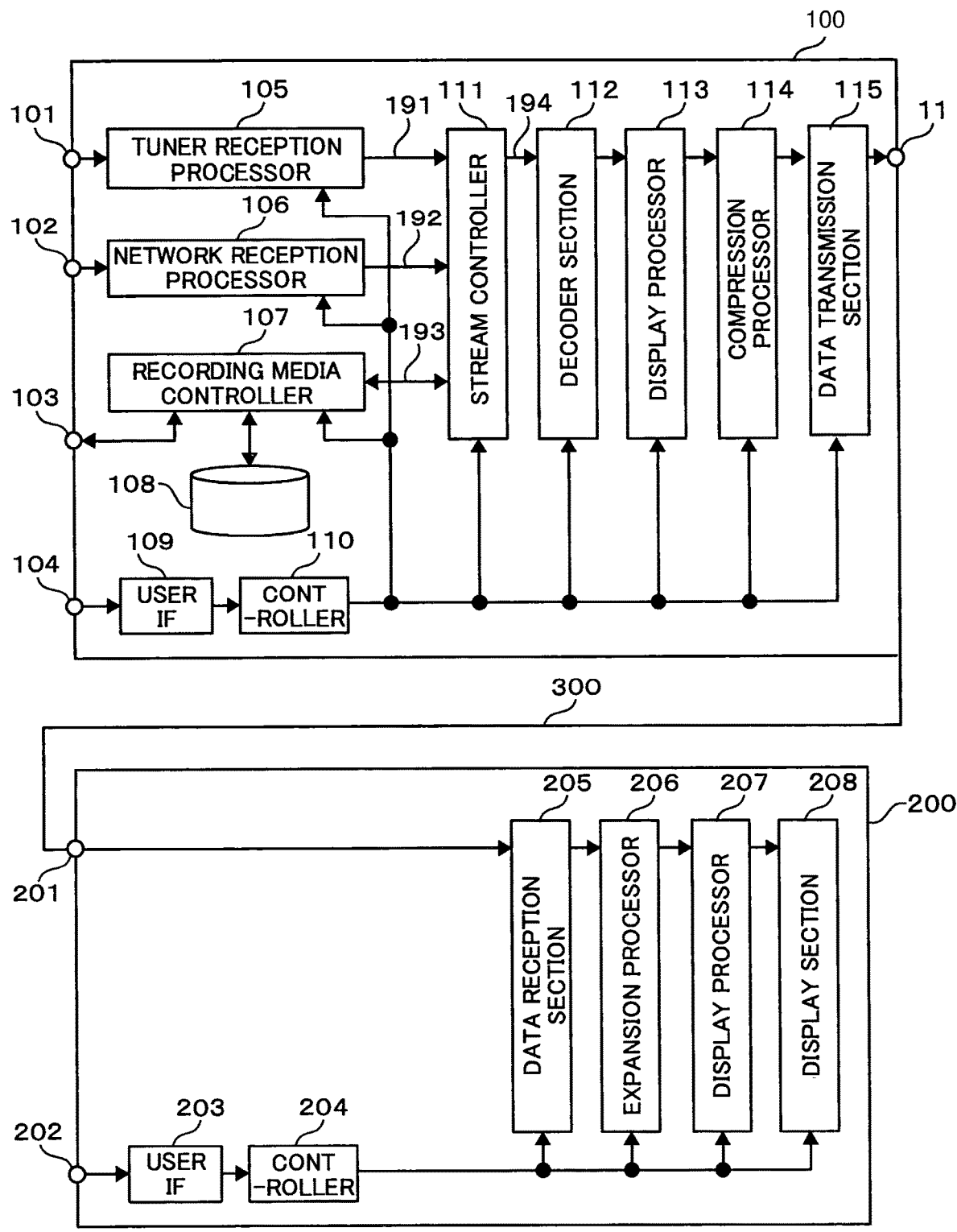
FIG. 1 shows one example each of an image transmission device and an image receiving device of a first embodiment.

FIG. 1, a block diagram illustrating the image transmission system of this embodiment, shows a configuration connecting image transmitting device 100 and an image receiving device 200 by a cable 300.

The image transmitting device 100 is an image transmitting device, an equipment item that transmits image data, outputting to another equipment item over an HDMI cable or the like image data obtained by receiving digital broadcasts, decoding them into a visible and audible form, image data recorded on a recording medium or image data photographed with a camera or the like. Examples of the image transmitting device 100 include recorders, digital TV sets with a built-in recording function, personal computers with a built-in recorder function, and mobile telephones or camcorders mounted with a camera function and a recorder function.

The image receiving device 200 is a display device that uses an HDMI cable or the like to receive inputs of image data and outputs images on a monitor. Examples of the image receiving device 200 include digital TV sets, display sections, projectors, mobile telephones and signage equipment.

The cable 300 is a data transmission path for carrying out data communication, such as that of image data between the image transmitting device 100 and the image receiving device 200. Examples of the cable 300 include a wire cable satisfying the HDMI standards or the DisplayPort standards, and a data transmission path for wireless data communication.

First, the configuration of the image transmitting device 100 will be described.

Input sections 101, 102 and 103 are input sections for inputting image data to the image transmitting device 100. One example of image data inputted to the input section 101 and processed by a tuner reception processor 105 is a digital broadcast inputted as electric waves from a relay station of a broadcasting station, a broadcast satellite or the like. To the input section 101, such electric waves from a relay station of broadcasting station, a broadcast satellite or the like are inputted.

One example of image data inputted to the input section 102 and processed by a network reception processor 106 is a digital broadcast or information contents distributed via a network by using broadband connection of the Internet.

One example of image data inputted to the input section 103 and processed by a medium controller 107 is contents recorded on an external recording medium connected to the input section 103. Another example of image data processed by the medium controller 107 is contents recorded in a recording medium 108 built into the image transmitting device 100. Examples of the recording medium 108 include an optical disk, a magnetic disk and a semiconductor memory.

The tuner reception processor 105 is a reception processor that converts an inputted electric wave into a bit stream, and it subjects the electric wave of the RF (Radio Frequency) band to frequency conversion to the IF (Intermediate Frequency) band and demodulates the modulation applied to the demodulated bit stream as signals of a certain band not dependent on the reception channel.

Examples of bit stream include an MPEG2 transport stream (hereinafter referred to as MPEG2-TS) and a bit stream of a format complying with MPEG2-TS. Descriptions of bit stream in the following paragraphs will refer to MPEG2-TS as a representative one.

The reception processor 105 further detects and corrects any code error having arisen on the way of transmission and, after descrambling the MPEG2-TS, selects one transponder frequency at which programs for playing back or recording are multiplexed, and separates a bit stream in this selected one transponder into one program of audio and a video packet.

The MPEG2-TS from the tuner reception processor 105 is supplied to a stream controller 111 via a data bus 181. The stream controller 111, to keep the intervals at the time packet reception by the tuner reception processor 105, detects PTS (Presentation Time Stamp), which is a time management information item, and an STC (System Time Clock) within a reference decoder of the MPEG system, and adds a time stamp at a timing corrected according to the result of detection.

The time stamp-augmented packet is supplied to either a decoder section 112 or the recording medium controller 107 or to both. A data path 194 to the decoder section 112 is used for processing when image data are to be played back, and a data path 193 to the recording medium controller 107 is used when recording image data onto a recording medium.

To a data path 192 of the stream controller 111, the MPEG2-TS coming from the input section 102 via the network reception processor 106 is inputted. The data path 192 is an input section that acquires a digital broadcast or digital contents distributed via a network.

Further, an external recording medium connected to the input section 103, or a digital broadcast or digital contents recorded on the recording medium 108 built into the image transmitting device 100 is read out as the MPEG2-TS by the recording medium controller 107, and inputted to the stream controller 111 via the data path 193. The stream controller 111 selects at least one of these inputs, and outputs it or them the decoder section 112.

The decoder section 112 decoded the MPEG2-TS inputted from the stream controller 111, and outputs the thereby generated image data to a display processor 113. The display processor 113, after subjecting the inputted image data to, for instance superposition of OSD (On Screen Display), rotation, expansion or contraction, or frame rate conversion, outputs the processed data to a compression processor 114.

The compression processor 114 compresses the image data from the display processor 113, and outputs the compressed data to a data transmission section 115.

The data transmission section 115 converts the image data compressed by the compression processor 114 (hereinafter to be referred to as compressed image data) into signals in a form suitable for transmission, and outputs it from an output section 116. Regarding the transmission of the image data, one example of signals in a form suitable for transmission is described in the HDMI standards. In HDMI, a data transmission format of the TMDS system is adopted for image data.

An input section 104 is an input section for inputting signals for controlling the operation of the image transmitting device 100. Examples of the input section 104 include a receiver unit for signals transmitted from a remote controller and a button fitted onto a device body. Control signals from the input section 104 are supplied to a user IF 109. The user IF 109 outputs signals from the input section 104 to a controller 110. The controller 110 controls the whole image transmitting device 100 in accordance with signals from the input section 104. One example of the controller 110 is a microprocessor. The image data from the image transmitting device 100 is supplied to the image receiving device 200 via the cable 300.

Next, the configuration of the image receiving device 200 will be described.

Signals in a form suitable for cable transmission are inputted to an input section 201. The signals inputted to the input section 201 are supplied to a data reception processor 205.

The data reception processor 205 performs processing conversion of signals in a form suitable for cable transmission into prescribed digital data, and outputs the converted digital data to an expansion processor 206.

The expansion processor 206 expands the compression processing accomplished with the compression processor 114 in the image transmitting device 100 to generate image data, and outputs the processed data a display processor 207.

The display processor 207 subjects the inputted image data to display processing. Examples of display processing include OSD superposition, expansion or contraction for conversion into the resolution of a display section 208, rotation and frame rate conversion. The output of the display processor 207 is supplied to the display section 208.

The display section 208 converts the inputted image data into signals matching the display system and displays the converted signals on a screen. Examples of the display section 208 include a liquid crystal display, a plasma display, an organic EL (Electro-Luminescence) display and a projector-projected display.

An input section 202 is an input section for inputting signals for controlling the operation of the image receiving device 200. Examples of the input section 202 a receiver unit for signals transmitted from a remote controller and a button fitted onto a device body. Control signals from the input section 202 are supplied to a user IF 203. The user IF 203 outputs signals from the input section 202 to a controller 204. The controller 204 is a controller that controls the whole image transmitting device 200 in accordance with signals from the input section 202.

Figure 2:
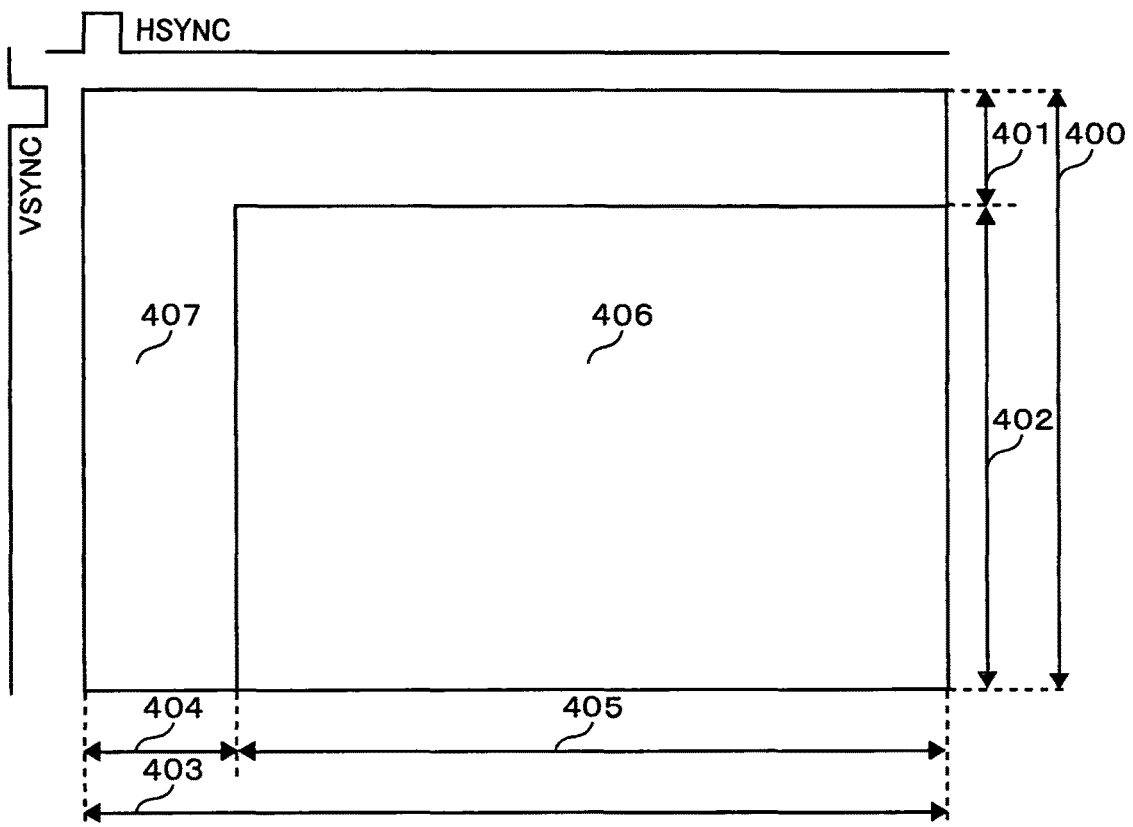
FIG. 2 shows one example of valid/blanking period of the image data in the first embodiment.

FIG. 2 shows a valid period in which image data of one frame period are transmitted and a blanking period in which no image data are transmitted.

The area denoted by 400 represents a vertical period, and the vertical period 400 includes a vertical blanking period 401 and a vertical valid period 402. A VSYNC signal is a one-bit signal, 1 representing a period of the prescribed number of lines from the beginning of the vertical blanking period 401 and 0 representing a period between any other vertical blanking period and a vertical valid period 402. One example of prescribed number of lines is four lines.

The area denoted by 403 represents a horizontal period, and the horizontal period 403 includes a horizontal blanking period 404 and a horizontal valid period 405. An HSYNC signal is a one-bit signal, 1 representing a period of the prescribed number of signal is a one-bit signal, 1 representing a period of the prescribed number of from the beginning of the horizontal blanking period 404 and 0 representing a period between any other horizontal blanking period and a horizontal valid period 405. One example of prescribed number of pixels is 40 pixels.

A valid period 406 is the area surrounded by the vertical valid period 402 and the horizontal valid period 405 and image data are allocated to this period. Further, a blanking period 407 is the area surrounded by the vertical blanking period 401 and the horizontal blanking period 404.

In this embodiment in this configuration, compressed image data and auxiliary compression coding information are transmitted in the valid period 406 and main compression coding information are transmitted in the blanking period 407.

In the blanking period 407, audio data and other incidental data are transmitted in a packetized form.

A method of reliably transmitting this packet containing audio data and the like in the blanking period 407 is disclosed, in for instance, the Japanese Unexamined Patent Application Publication (Translation of PCT Application) No. 2005-514873.

As error correction codes are included in packeted data in the blanking period in this configuration, errors arising on the transmission path can be corrected, resulting in strengthened error resistance. Further, as the configuration is such that the data to be transmitted in the packeted form during the blanking period is transmitted over two physically different channels, and the transmission channel is switched over at prescribed intervals of time, an error having arisen on one channel in a burst mode does not affect the pother channel, data errors can be corrected. The correction rate of errors is sufficient to achieve an improving effect of $10^{-14}$ in the horizontal blanking period against $10^{-9}$ in horizontal valid period.

In this example, 24 bits of image data per clock are transmitted during the valid period 406, and in the blanking period 407 one packet including a 3-byte header and 28-byte data is transmitted in a 32-clock period.

For instance, when 12 bits each of signals of horizontal 3840 valid pixels, vertical 2160 valid lines and YCbCr luminance chromatic difference are to be transmitted in the 444 format at a frame frequency of 60 Hz, a very high clock frequency of 891 MHz is required. A high clock frequency not only needs a costly transmission and reception units but also entails a decrease in cable length permitting stable transmission of images, resulting in inconvenience in use.

This embodiment makes it possible to approach a practically useful clock frequency, 594 MHz by ⅔ compression or 297 MHz by ⅓ compression. Further by the 444 format of 8 bits each the 422 format of 12 bits each of YCbCr luminance chromatic difference signals, a practically useful clock frequency of 297 MHz can be achieved by ½ compression.

Where there are 3840 horizontal valid pixels and 2160 vertical valid lines, for instance, the horizontal blanking period has 560 horizontal blanking pixels and the vertical blanking period has 90 vertical blanking lines. The following description will refer to a case of compressing 12 bits each of YCbCr luminance chromatic difference image signals in the 444 format of 3840 horizontal valid pixels, 2160 vertical valid lines and 60 Hz frame frequency are compressed to ⅓ by way of example.

The clock frequency after compression is 297 MHz and, in a transmission under the conditions of 1940 horizontal valid pixels, vertical 2160 valid lines, 280 horizontal blanking pixels and 90 vertical blanking lines, permits easy reproduction of the original clock of 594 MHz, double the transmission frequency, on the receiving side on a stable basis. During the period of horizontal valid pixels if 12 bits of YCbCr luminance chromatic difference signals per pixel, or a total of 36 bits are compressed to ⅓, namely 12 bits, 24 bits per pixel after the compression can be transmitted, and therefore two pixel-equivalent of the original pixel can be transmitted, resulting in halving of the original clock frequency after the compression.

Since one packet per 32 clocks can be transmitted, a maximum of eight packets of 280 compressed horizontal blanking pixels can be transmitted. On the other hand, 24 bits×8 ch of audio data per packet can be transmitted. As the horizontal frequency of image data is 135 kHz (=60 Hz× (2160+90)), when 24 bits of linear PCM audio data of 192 kHz samples are to be transmitted over 8 ch, a maximum of two packets is required in one horizontal blanking period. It is desirable that, for the remaining six packets, compression coding type information can be stated within 168 bytes (=28 bytes×6 packets).

On the other hand, when the aforementioned 32 pixels are to be compressed as a unit block, a stating space for YCbCr luminance chromatic difference signals equivalent to 120 blocks of information of different compression coding systems, or an equivalent of 360 blocks in total, is needed because there are 3840 horizontal valid pixels. If the main compression coding information is expressed in three bits for instance, the stating space will be equivalent 135 bytes, permitting transmissions of five packets, and it can be compatible with a large capacity audio data transmission of 192 kHz, 8 ch.

Figure 3:
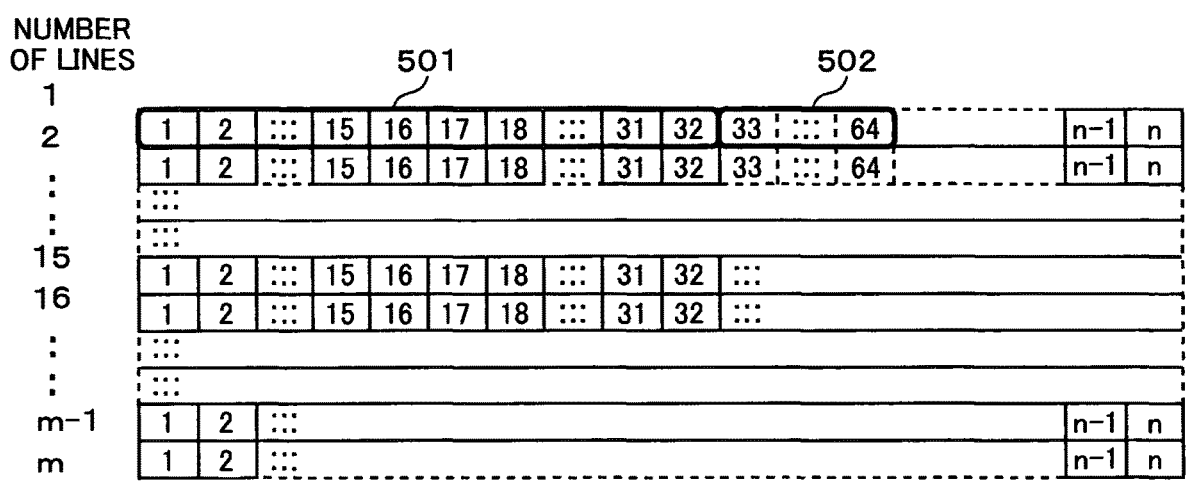
FIG. 3 shows one example of units of image data to be compressed in the first embodiment.

FIG. 3 and FIG. 4 show examples of image data inputted to the compression processor 114. Luminance signals of n pixels in the horizontal direction and m lines in the vertical direction are shown. Chromatic difference signals, in the case of the 444 format, take on the same format as luminance signals. Examples of the number of pixels n and the number of lines m include a so-called full HD image of n=1920, m=1080, and a so-called 4 k2 k image of n=3840, m=2160.

Here, the unit block of image data compressed by the compression processor 114 (hereinafter to be referred to as compressed block) shall be 1 pixels in the horizontal direction and k pixels in the vertical direction. In FIGS. 3, 501 and 502 represent cases of l=32, k=1, and are configured of 32 consecutive pixels on the same line. In this image data unit, the compression processor 114 carries out compression.

In FIGS. 4, 503 and 504 represent cases of l=16, k=2, and are configured of 16 consecutive pixels on two lines, upper and lower. In this image data unit, the compression processor 114 carries out compression. For compression processing, the configuration may as well have a horizontal compressor and a vertical compressor, k1 and k2 (k1<k2) image data unit blocks made available, differing in the pixel number k in the vertical direction, and the horizontal compressor and the vertical compressor 134 respectively compressing the k1 image data unit blocks and the k2 image data unit blocks.

Although a case of 32 pixels has been described as an example of image data unit to be compressed, the unit may as well be 64 pixels or 128 pixels.

When the inputted chromatic difference signals are in the 422 format, the data will have one pixel each of the Cb component and the Cr component of the chromatic difference signals alternately. For instance in a 4 k2 k image, they may as well be treated as image data of n=3840, m=2160 in the total of Cb components and Cr components. Since the correlation level is high among Cb components and among Cr components, the efficiency of compression can be enhanced by separating Cb components and Cr components from each other, treating either as components of n=1920, m=2160 and making them an image data unit block of only the same components to be compressed.

When the inputted chromatic difference signals are in the 420 format, the data will have one pixel each of the Cb component and the Cr component of the chromatic difference signals for four pixels of Y signals. For instance in a 4 k2 k image, they may as well be treated as image data of n=1920, m=2160 in the total of Cb components and Cr components. Since the correlation level is high among Cb components and among Cr components, the efficiency of compression can be enhanced by separating Cb components and Cr components from each other, treating either as components of n=1920, m=2160 and making them an image data unit block of only the same components to be compressed.

The compression coding information is configured of main compression coding information and auxiliary compression coding information. On the basis of the main compression coding information and the auxiliary compression coding information, expansion of compressed image data to the original image data can be processed.

With only main compression coding information, simple expansion or partial expansion can be processed.

Main compression coding information is transmitted over a transmission path higher in error-resistivity than that for auxiliary compression coding information. In this embodiment, compressed image data and auxiliary compression coding information are transmitted to the valid period 406, and main compression coding information is transmitted to the blanking period 407. As an example of transmitting main compression coding information in the blanking period 407, there is a method by which common main compression coding information is transmitted in the vertical blanking period 401 line by line, main compression coding information on compressed blocks on the same line is transmitted in the horizontal blanking period 404.

Where this configuration is used, even if an error occurs in auxiliary compression coding information on a transmission path of a high transmission error rate, the probability of error occurrence in main compression coding information is significantly reduced. As a result, when an error has occurred in auxiliary compression coding information on a transmission path of a high transmission error rate, disturbance of display can be restrained by using simply expanded or partially expanded image data, created by utilizing main compression coding information, for error correction. Also, by including the compressed block size in main compression coding information when an error has occurred in auxiliary compression coding information, disturbance of display can be restrained within the compressed block.

Further, compression coding information may as well be configured solely of main compression coding information or auxiliary compression coding information.

An example of configuration of compression coding information and compressed image data is shown in FIG. 5.

In this example, the unit of a compressed block 600 is configured of sub-compressed blocks 610 and 620, and the sub-compressed block blocks 610 and 620 are configured of pixels 611, 612, 613 and 614 and pixels 621, 622, 623 and 624, respectively.

One example of configuration of a compressed block after compression is represented by 630. The compressed block 630 is configured of compression coding information 631 and compressed image data 632. The compressed image data 632 is a compressed image data set generated by compressing pixel data sets 611, 612, 613, 614, 621, 622, 623 and 624. The compression coding information 631 is information generated by compression processing. When compression coding information is transmitted in the valid period 406 in this configuration, if the transmission error rate is high, the probability of error occurrence also in the compression coding information increases, entailing a problem that display disturbance becomes more likely to arise in compressed block units. Further, when compression coding information is transmitted in the blanking period 407, the quantity of transmittable data becomes significantly smaller than in the valid period 406, entailing a problem of reduction in the quantity of compression coding information.

Another example of configuration of a compressed block after compression is represented by 640. In this example, compression coding information is configured of main compression coding information 641 and two kinds of auxiliary compression coding information 642 and 644. The compressed block 640 is configured of the main compression coding information 641, the auxiliary compression coding information sets 642 and 644, and compressed image data sets 643 and 645. The compressed image data 643 is a compressed image data set generated by compressing the image data sets 611, 612, 613 and 614 belonging to the sub-compressed block 610. The auxiliary compression coding information 642 is an information set generated by processing compression of the pixel data sets 611, 612, 613 and 614. The compressed image data set 645 is a compressed image data set generated by compressing the image data sets 621, 622, 623 and 624 belonging to the sub-compressed block 620. The auxiliary compression coding information 644 is an information set generated by processing compression of the pixel data sets 621, 622, 623 and 624.

Another example of configuration of a compressed block after compression is represented by 650. In this example, compression coding information is configured of two kinds of information including main compression coding information 651 and auxiliary compression coding information 652. The compressed block 650 is configured of the main compression coding information 651, the auxiliary compression coding information 652 and compressed image data 653. The compressed image data 653 is a compressed image data set generated by compressing the image data sets 611, 612, 613, 614, 621, 622, 623 and 624 contained in the compressed block 600. The main compression coding information 651 and the auxiliary compression coding information 652 are information sets generated by processing compression of the compressed block 600.

Another example of configuration of a compressed block after compression is represented by 660. The difference between this example and the compressed block 650 after compression lies in that auxiliary compression coding information 662 is information generated by further compressing the auxiliary compression coding information 652 in the compressed block 650 after compression. Though not illustrated here, the quantity of transmitted data may be reduced by further compressing the main compression coding information 651.

Where the aforementioned configuration of the compressed blocks 640, 650 and 660 after compression is adopted, it becomes possible to restrain the influence of any transmission error on the displayed image (restored image) while suppressing the quantity of data transmitted over the more error-resistive transmission path by transmitting main compression coding information over a more error-resistive transmission path than auxiliary compression coding information.

Figure 6:
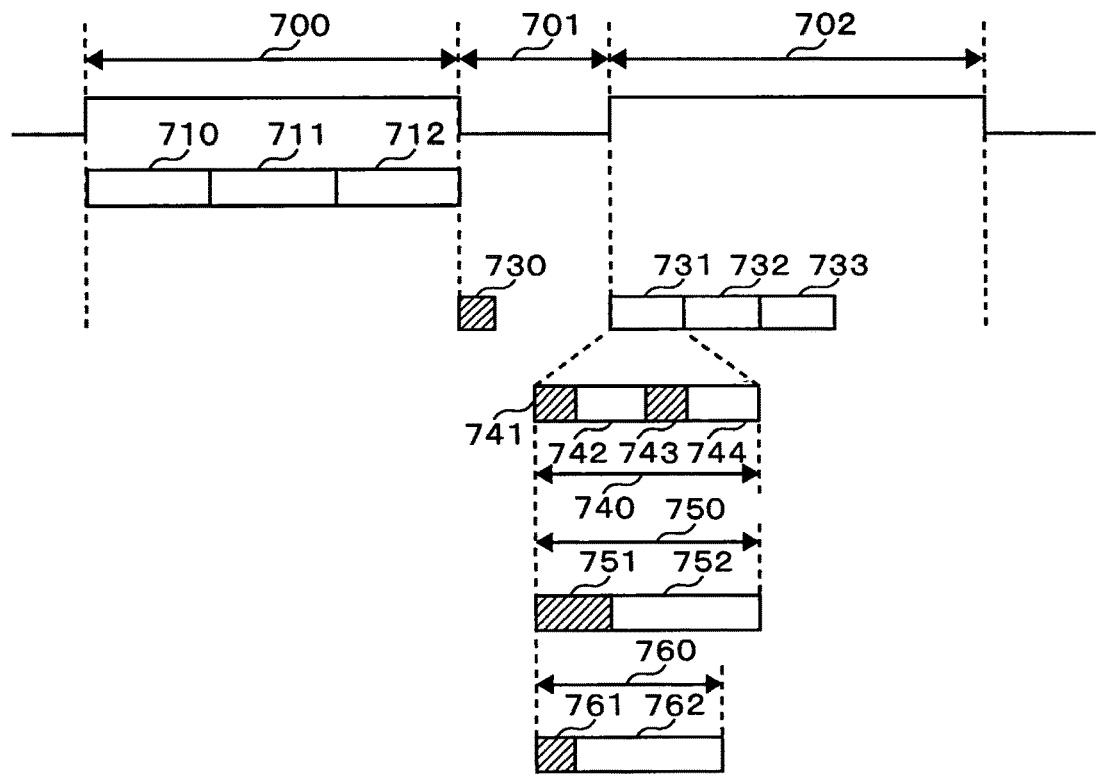
FIG. 6 shows one example of data transmission timing in the first embodiment.

FIG. 6 illustrates the transmission timing for the compressed blocks 640, 650 and 660 after compression shown in FIG. 5. Reference numerals 700 and 702 denote the valid period 406, and 701 denotes the horizontal blanking period 404. Reference numerals 710, 711 and 712 denote one line-equivalent of image data before compression to be transmitted in the valid period 700. In this example, the three compressed blocks 710, 711 and 712 are processed for compression.

Reference numeral 730 denotes main compression coding information generated by processing compression of the compressed blocks 710, 711 and 712. Reference numerals 731, 732 and 733 denote compressed blocks generated by processing compression of the compressed blocks 710, 711 and 712. The compressed blocks are configured of compressed image data and auxiliary compression coding information generated by compression processing. As one example of the configuration of the compressed block 731, 740, 750 and 760 are shown. They respectively correspond to the sub-compressed blocks 640, 650 and 660 after compression shown in FIG. 5.

The main compression coding information 730 is transmitted in the horizontal blanking period 701, which is more error-resistive than the valid periods 700 and 702. Further, the compressed blocks 731, 732 and 733 after compression configured of compressed image data generated by processing compression of the image data 710 and auxiliary compression coding information are transmitted over the valid period 702, next to the horizontal blanking period 701. To add, some or all of main compression coding information may as well be transmitted in the vertical blanking period 401.

One example of main compression coding information and auxiliary compression coding information will be described with reference to FIG. 28.

Here is considered a case of compression processing in which the unit of compressed blocks 920 is 32 horizontal pixels and that of sub-compressed blocks 921, 922, 923 and 924 is 8 pixels. Compression coding information 926 for the leading sub-compressed block 921 is supposed to be main compression coding information, and compression coding information sets 927, 928 and 929 for the other three sub-compressed blocks are supposed to be auxiliary compression coding information.

The main compression coding information is configured of the compression coding information 926 for the leading sub-compressed block 921 and other compression coding information sets for use in the processing to expand the sub-compressed block 921 (for instance the common compression coding information 925 for the sub-compressed blocks and the like).

The auxiliary compression coding information is configured of the compression coding information sets 927, 928 and 929 for the second and subsequent sub-compressed blocks 922, 923 and 924.

The use of the configuration of this example enables display disturbance to be restrained by using, when an error has occurred in the auxiliary compression coding information on a transmission path of a high transmission error rate, image data belonging to the leading sub-compressed block expanded by the use of the main compression coding information for correction of the error. One example of such error correction is generating and displaying a complementing image belonging to the error-ridden sub-compressed block from image data belong to the leading sub-compressed block out of the compressed blocks expanded by the use of the main compression coding information.

One example pertinent to the transmission path is a method by which auxiliary compression coding information (FIG. 28(c)) and a compressor output (FIG. 28(d)) are transmitted in the valid period 406 and main compression coding information is transmitted in the horizontal blanking period 404 greater in error-resistivity.

Another example of main compression coding information and auxiliary compression coding information will be described with reference to FIG. 27.

Here is considered a case of compression processing in which the unit of compressed blocks 900 is 32 horizontal pixels and that of sub-compressed blocks 901, 902, 903 and 904 is 8 pixels.

A first compressor (compressor A133) processes first compression of the sub-compressed blocks 901, 902, 903 and 904 in sub-compressed block units, and auxiliary compression coding information sets (first compression coding information sets 905, 906, 907 and 908) in sub-compressed block units and compressed image data sets (first compressed image data sets 909, 910, 911 and 912). A second compressor (compressor B134) further processes second compression of four inputted compressed image data sets (first compressed image data 909, 910, 911 and 912) in sub-compressed block units, and generates one each of main compression coding information set (second compression coding information set 914), compressed image data set (second compressed image data set 914) and compressed image data set (second compressed image data set 915). By transmitting the main compression coding information over a transmission path higher in error resistivity than the transmission path for the auxiliary compression coding information sets (first compression coding information sets 905, 906, 907 and 908) and the compressed image data set (second compressed image data set 915), expansion can be processed even in sub-compressed block units on the transmission path higher in transmission error rate, and the range affected by errors can be restrained to the range of sub-compressed blocks.

Error resistivity can be further enhanced by transmitting a common compression coding information set 913 for the first compression coding information sets 905, 906, 907 and 908 as main compression coding information in addition to the second compression coding information 914.

As another instance of compression coding information, here is considered compression processing in which, for instance, the compressed block unit is 32 horizontal pixels and the sub-compressed block unit is 8 pixels, and size information is added in sub-compressed block units. The overall total of size information sets in sub-compressed block unit, namely size information on compressed block unit is included in main compression coding information, and size information is included in auxiliary compression coding information in sub-compressed block unit. By transmitting the main compression coding information over a transmission path higher in error resistivity, if an error arises in the auxiliary compression coding information on a transmission path higher in transmission error rate, the error can be prevented from affecting the next compressed block by generating the size of compressed block units on the basis of the main image coding information and skipping expansion processing equivalently to that size.

If there is a surplus capacity for data transmission on a transmission path higher in error resistivity, the whole size information on individual sub-compressed blocks may as well be transmitted as main compression coding information. In this case, if an error arises in auxiliary compression coding information, the error can be prevented from affecting other sub-compressed blocks by generating the size of the sub-compressed block in which the error has occurred on the basis of the main image coding information and refraining from expansion processing equivalently to that size.

Figure 7:
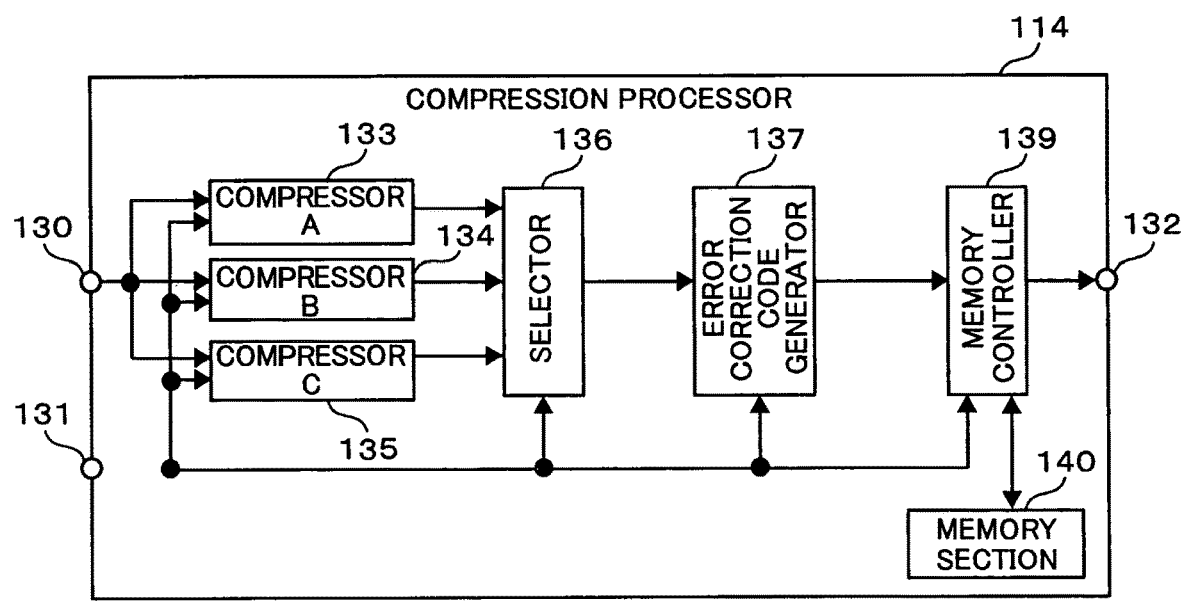
FIG. 7 shows one example of compression processor in the first embodiment.

FIG. 7 is a block diagram showing one example of the compression processor 114.

An input section 130 is an input section for inputting image data to the compression processor 114.

The inputted image data are supplied to a compressor A133, a compressor B134 and a compressor C135. The compressor A133, compressor B134 and compressor C135 process compression of the inputted image data in different ways from one another, and generate compression coding information and compressed image data. To add, any other compressor than what is designated by a control signal 131 can be suspended from compression processing or the action clock itself can be stopped to save power consumption.

Each of the compressor A133, compressor B134 and compressor C135 is configured of a compressing circuit that compresses a plurality of image data sets constituting a compressed block. One example of compression formula can be configured by operating Wavelet conversion in the horizontal direction and coding the result of the arithmetic operation. As the compression formula, Hadamard transform, run length encoding, Huffman encoding, differential encoding or the like may be applied.

Further, as another example of compression formula, a compressing circuit that compresses a plurality of image data sets in the vertical direction. By one example of compression formula, first a difference is taken in the vertical direction for compressing a unit block of image data of two lines in the vertical direction and 16 pixels in the horizontal direction, and then a difference is taken in the horizontal direction. A compression formula of encoding the result can be used.

One example of other compression formulas uses a circuit that, when chromatic difference signals of the 444 format or 422 format are inputted, curtails them into the 422 format or the 420 format. When the 444 format or the 422 format is inputted, if a prescribed compression rate is surpassed in the compression processor 114 shown in FIG. 8 to be referenced afterwards, curtailment to the 422 format or the 420 format may be processed as well.

The compression rate in this context means the ratio of the data quantity after compression to that before compression. If, for instance, the data quantity before compression is 100 and the data quantity after compression is 30, the compression rate is 30%. Therefore, the higher the compression rate, the greater the data quantity after compression, resulting in less deterioration of picture quality.

Figure 10:
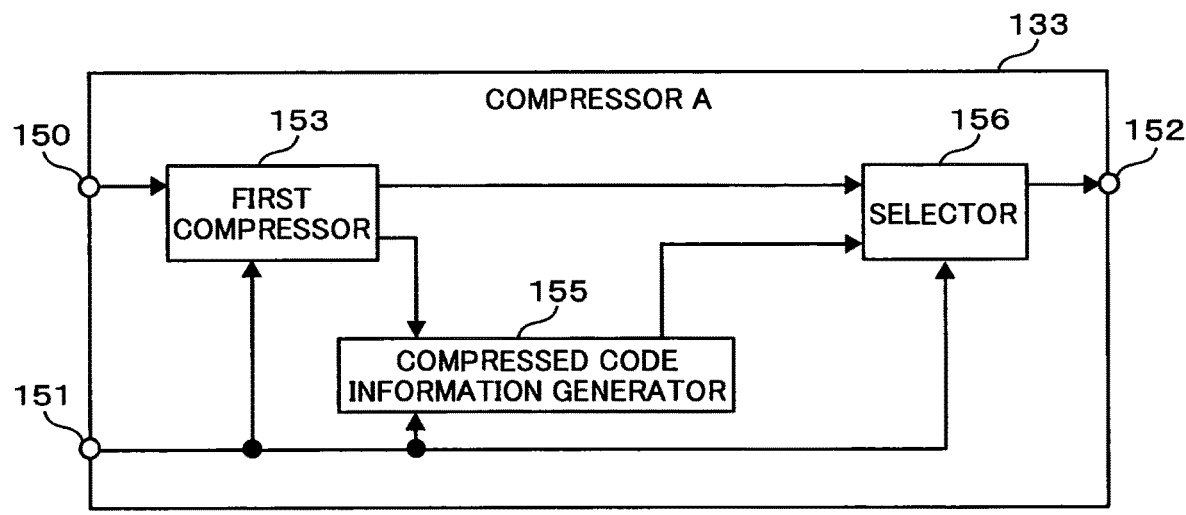
FIG. 10 shows one example of compressor A in the first embodiment.

FIG. 10 is a block diagram showing one example of configuration of the compressor A133.

An input section 150 is an input section for inputting image data to the compressor A133.

An input section 151 is an input section for inputting control signals for controlling the compressor A133.

A first compressor 153 is a block that processes compression of inputted image data and generates compression coding information and compressed image data. The compression coding information generated by the first compressor 153 is supplied to the compressed code information generator 155. Further, the compressed image data generated by the first compressor 153 are supplied to a selector 156.

The compressed code information generator 155 is a block that generates main compression coding information and auxiliary compression coding information from the inputted compression coding information. The compressed code information generator 155 may as well have a memory for temporarily storing the generated main compression coding information and auxiliary compression coding information.

The selector 156 is a block that selects and outputs the compressed image data supplied from the first compressor 153 and the main compression coding information and auxiliary compression coding information data supplied from the compressed code information generator 155.

Figure 11:
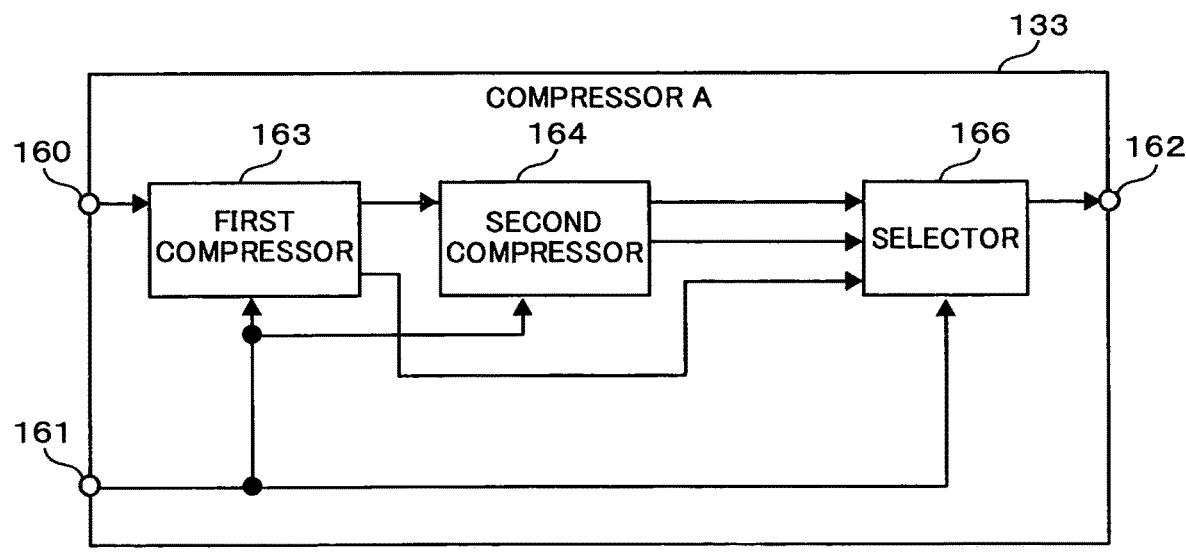
FIG. 11 shows one example of compressor A in the first embodiment.

FIG. 11 is a block diagram showing one example of configuration of the compressor A133.

An input section 160 is an input section for inputting image data to the compressor A133.

An input section 161 is an input section for inputting control signals for controlling the compressor A133.

A first compressor 163 is a block that processes first compression of inputted image data and generates auxiliary compression coding information and compressed image data. The auxiliary compression coding information generated by the compressor 163 is supplied to a selector 166. Further, the compressed image data generated by the first compressor 163 are supplied to a second compressor 164.

The second compressor 164 is a block that processes second compression of inputted compressed image data and generates main compression coding information and compressed image data. The main compression coding information and compressed image data generated by the second compressor 164 are supplied to a selector 166.

The selector 166 is a block that selects and outputs auxiliary compression coding information supplied from the first compressor 163 and main compression coding information and compressed image data supplied from the second compressor 164.

The configuration of this example makes possible the processing of compression in two stages shown in FIG. 27. Further, though this example is a case of using two compressors, compressors may as well be provided for three or more stages.

The outputs of the compressor A133, compressor B134 and compressor C135 are supplied to a selector 136.

Although the description of this case refers to a compression processor having three compressors 133, 134 and 135, the number of compressors may as well be only one or two, or four or more.

The selector 136 selects out of the compressor A133, compressor B134 and compressor C135 what satisfies a compression rate requirement and has a high picture quality index, and supplies it to an error correction code generator 137. The picture quality index is an index whose value improves with a decrease in difference between, for instance, image data restored from compressed image data and image data before compression. The highest level is achieved no compression loss arises and reversible coding is accomplished. To simplify the calculation of the picture quality index, the value of the picture quality index may be prepared in advance for each different compression formula. It may be so defined that a higher picture quality index is achieved when reversible coding is accomplished after curtailment to the 422 format than when compression is done without changing from the 444 format to invite generation of compression loss. If compression rather results in an increased data quantity, a prescribed compression rate is achieved by opting for curtailment to the 422 format or the 420 format before compression or reducing the number of quantified bits, and a picture quality index is so set as to match the curtailment or the reduction in the number of quantized bits.

Also, the operation of any one of the compressor A133, compressor B134 and compressor C135 may be validated with a control signal inputted from an input section 131, with the two others suspended from operation. In this case, control information indicating the compressor whose operation is valid is inputted to the selector 136 from the input section 131. The selector 136, on the basis of the control information, outputs an output signal of the is compressor whose operation is valid to the error correction code generator 137.

An error correction code generator 136 calculates an error correction code for each unit of image data compressed by the compressor C135, compressor A133 and compressor B134 (compressed image data), adds the code to the compressed image data, and outputs the image data units to a memory controller 139. Available systems of error correction include the CRC (Cyclic Redundancy Check) system and the parity check system.

Whether or not to add the error correction code may be determined according to the data transmission capacity. The reason is that, if the data transmission capacity of the cable is limited, adding the error correction code would involve curtailment of more pixels or tones of gradation and accordingly invite picture quality deterioration over the whole screen. If there is a surplus in transmission capacity, the error correction code may be added to the compressed image data to enhance error resistivity. Determination of whether or not to process error correction may be left to the receiving side by transmitting together metadata on whether or not error correction is added to compressed image data. Also, the error resistivity level may be varied by altering error correction processing according to the compression formula applied, or information indicating what error correction code has been added may as well be added as metadata. Or no error correction may be processed and input data may be outputted as they are.

The memory controller 139 temporarily accumulates in a memory unit 140 compressed image data, main compression coding information and auxiliary compression coding information supplied from an error code generator 137. It also reads the main compression coding information and the compressed image data out of the memory unit 140 and outputs them in the valid period 406. Further, it reads the main compression coding information out of the memory unit 140, and outputs it in the horizontal blanking period 404 immediately preceding the valid period 406 in which the compressed image data are outputted. By another formula, any of compressed image data, main compression coding information and auxiliary compression coding information with an error correction code for one line may be transmitted in the valid period 406 for one line thereby to increase the transmission quantity. Also, the reliability of error correction may be enhanced by containing the error correction code in the main compression coding information and outputting the information in the horizontal blanking period 404.

An output section 132 outputs compressed image data, main compression coding information and auxiliary compression coding information from the memory controller 139. Though not shown, operations of the blocks in FIG. 7 are controlled in accordance with control signals from the controller 110 shown in FIG. 1.

Figure 12:
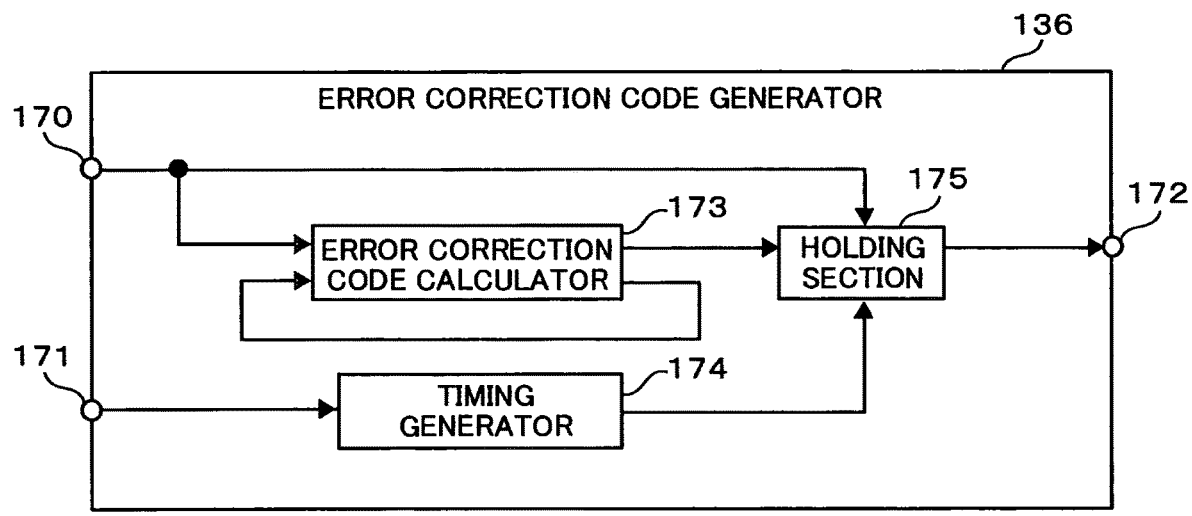
FIG. 12 shows one example of error correction code generator in the first embodiment.

FIG. 12 is a block diagram showing one example of configuration of the error correction code generator 136. To the input section 170, compressed image data is inputted. The compressed image data is inputted to a holding unit 175 and an error correction code calculator 173. The error correction code calculator 173 subjects the inputted compressed image data to a cyclic operation using a generating polynomial.
Examples of generating polynomial include:

$$G(X)=X^{16} \times X^{12} \times X^{5}+1 \quad \text{(Mathematical expression 1)}$$

This generating polynomial gives a cyclic operation taking an exclusive OR of the bits in the inputted compressed image data. The unit of the operation shall be the unit of the compressed image data.

An input section 171, to which a signal indicating the period during which compressed image data is entered is inputted, supplies this signal to a timing generator 174. The timing generator 174 outputs a signal indicating that a unit block equivalent of image data to count and compress the valid period of the compressed image data has been processed to the data holding unit 175 as an error correction calculation result output timing signal. Further, the timing generator 174 outputs together to the data holding unit 175 a timing signal indicating the input period of compressed image data and a timing signal indicating the compressed image data and the results of calculating the error correction code.

The data holding unit 175 temporarily stores, in accordance with the timing indicated by the timing generator 174, the results of calculation by the error correction code calculator 173 and the compressed image data into, for instance, a memory, flip-flop, delay element or the like, and successively outputs them to the output section 132.

Figure 13:
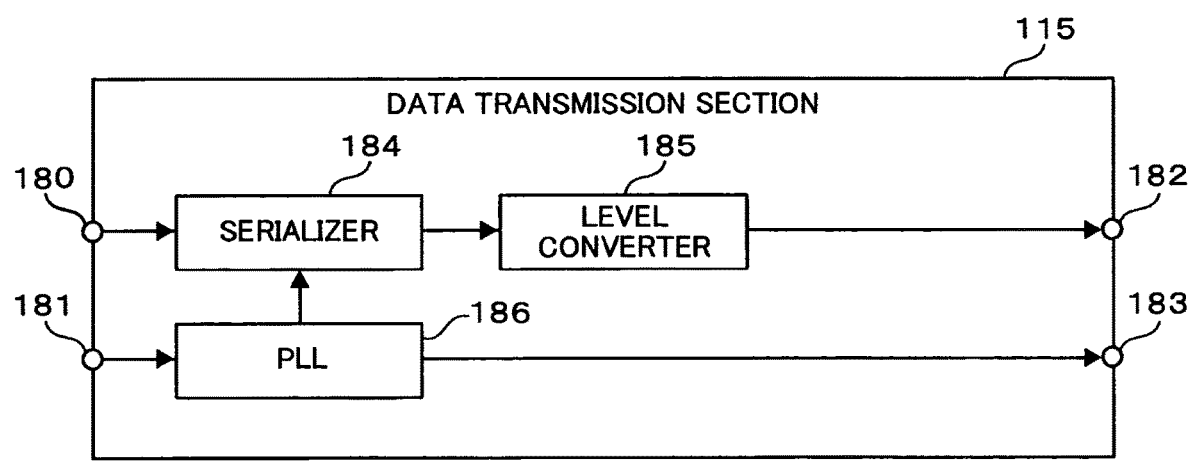
FIG. 13 shows one example of data transmission section in the first embodiment.

FIG. 13 is a block diagram showing one example of configuration of the data transmission section 115.

An input section 180 outputs compressed image data to a serializer 184. Further, an input section 181, to which the clock of image data is inputted, outputs it to a PLL 186 and an output section 182.

As the clock of image data, a clock synchronized with the pixel clock used in the standard timing format of uncompressed image data is used. For instance, a clock obtained by half division of the pixel clock of uncompressed image data is used. In this case, as the clock will be ½ and the number of quantized bits will be 8/12 if the uncompressed image data are 12-bit quantized image data, the aforementioned prescribed compression rate should be set ⅓ or less. The clock may be ¾ multiplied or ⅔ multiplied instead of being half divided. Using the clock synchronized with the pixel clock of uncompressed image data for transmitting the compressed image data provides the advantage that the receiving side, when restoring the uncompressed image data, can minimize the jittering of restored data by using a clock resulting from 4/2, 4/3 or 3/2 multiplication of the transmission clock as the pixel clock.

The PLL 186 generates a clock or clocks by multiplying or dividing the inputted clock. Examples of multiplication include fivefold or tenfold multiplication of the frequency of the inputted clock. Either only one type of clock or two types of clock may be chosen for the clock generated by the PLL 186. One example of one type of clock is a tenfold-multiplied product of the inputted clock. Examples two types of clock included a first clock speed giving priority to the data transmission quantity and a second clock speed slower than the first clock speed to give priority to reducing the frequency of error occurrence. Examples of speed include the first clock speed of tenfold-multiplied product of the input clock and the second clock speed of fivefold-multiplied product of the input clock.

The multiplied clock or clocks generated by the PLL 186 are outputted to the serializer 184.

The serializer 184 serializes the compressed image data of the inputted YCbCr luminance chromatic difference signals bit by bit with a tenfold-multiplied clock, and outputs the serialized data to a level converter 185. When there are 8 bits of data to be inputted to the input section 180 per clock inputted to the input section 181, the TMDS transmission method, for instance, may be used by which DC components of a bit stream resulting from mapping and serializing the eight-bit data are suppressed. Where there are three cables to be connected to an output section 176, 24 bits of compressed image data per input clock can be transmitted by serializing the data for each individual cable.

The level converter 185 outputs signals of a form suitable for cable transmission via the output section 182.

Figure 8:
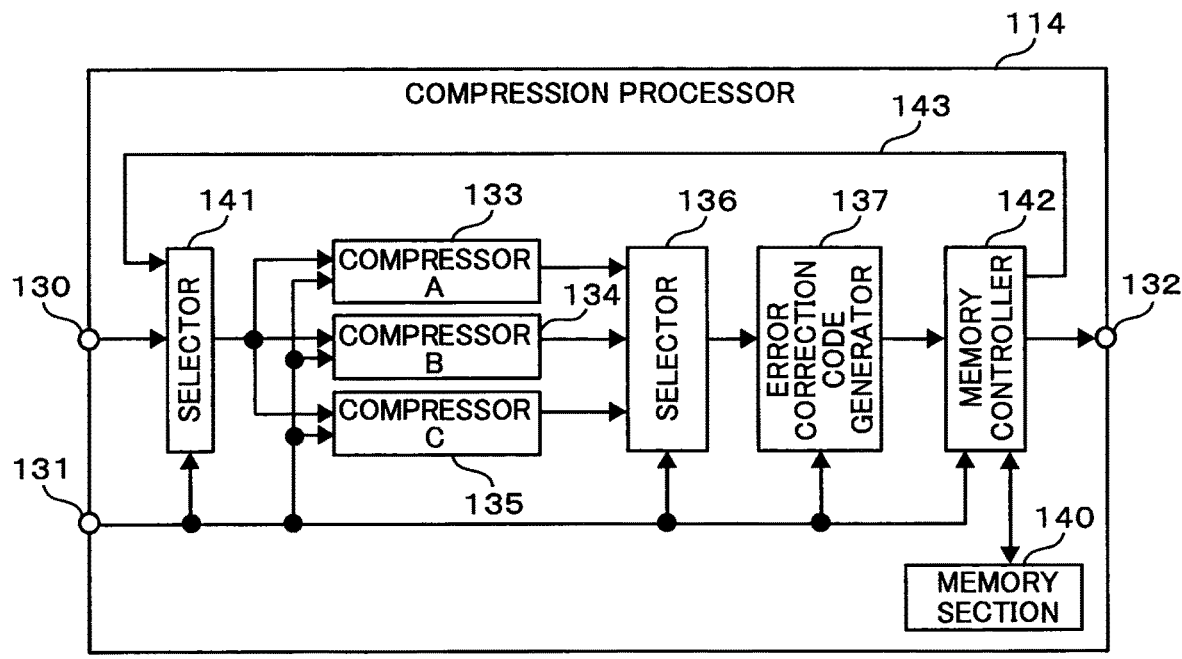
FIG. 8 shows another example of compression processor in the first embodiment.

FIG. 8 is a block diagram showing another example of configuration of the compression processor 114.

A memory controller 142 temporarily accumulates in the memory unit 140 compressed image data, main compression coding information and auxiliary compression coding information supplied from the error code generator 137. It also reads auxiliary compression coding information and compressed image data out of the memory unit 140, and outputs them in the valid period 406. It further reads main compression coding information out of the memory unit 140, and outputs it in the horizontal blanking period 404 immediately preceding the valid period 406 in which compressed image data are outputted. Further, it can read compressed image data out of the memory unit 140 and supply them to a selector 141.

The selector 141 is a block that selects either image data inputted from the input section 130 or compressed image data 143 supplied from the memory controller 142 and supplies what it has selected to the compressor A133, compressor B134 and compressor C135. It may as well output the image data inputted from the input section 130 to a prescribed compressor and at the same time output the compressed image data 143 to some other compressor. The configuration of this example makes possible two-stage compression processing shown in FIG. 27. Compression in three or more stages may also be processed.

Figure 9:
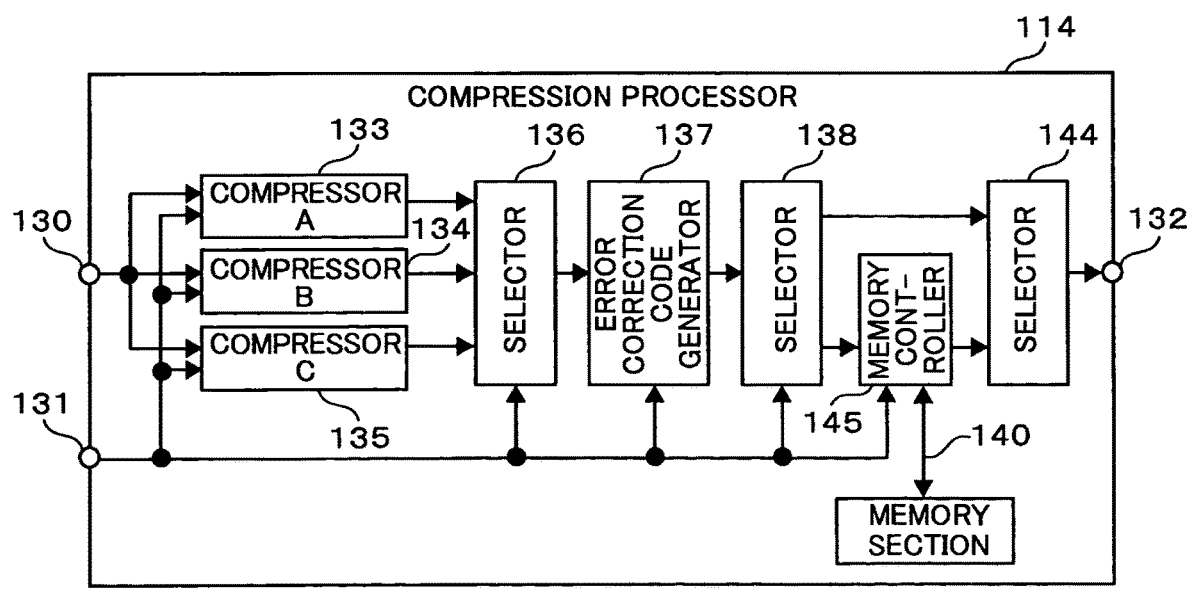
FIG. 9 shows another example of compression processor in the first embodiment.

FIG. 9 is a block diagram showing still another example of configuration of the compression processor 114.

A selector 138 outputs to a memory controller 145 main compression coding information and auxiliary compression coding information supplied from the error code generator 137, and outputs to a selector 144 compressed image data supplied from the error code generator 137.

The memory controller 145 temporarily accumulates in the memory unit 140 main compression coding information and auxiliary compression coding information supplied from the selector 138. It also reads auxiliary compression coding information out of the memory unit 140, and outputs it in the valid period 406, to be described afterwards, via the selector 144. It further reads main compression coding information out of the memory unit 140, and outputs it via the selector 144 in the horizontal blanking period 404 immediately preceding the valid period 406 in which it outputs auxiliary compression coding information.

The selector 144 is a block that selects compressed image data supplied from the selector 138 and main compression coding information and auxiliary compression coding information data supplied from the memory controller 145, and outputs them to the output section 132.

In this example, the selector 138 may output auxiliary compression coding information, together with compressed image data, directly to the selector 144 without going via the memory controller 145. In this case, the memory controller 145 processes reading and writing of main compression coding information out of and into a memory. By choosing the configuration of this example, the memory capacity of the memory unit 140 on the transmitter 100 side can be kept small.

FIG. 14 through FIG. 17 show an example of packet for transmitting some of main compression coding information.

FIG. 14 and FIG. 16 show an example of packet header, which a common header type 0Bh, indicating that this is information regarding the compression coding formula according to the invention, is stated in the first header block HB0. Each bit of HB1 and bits 4 through 7 of HB2 are 0 for future expansion. Eco_Packet # shown in bits 0 through 3 of HB2 indicates identification in the frame. FIG. 15 and FIG. 17 show an example of data of 28 bytes transmitted following the header.

In the header of FIG. 14, 0 h is allocated as Eco_Packet #, indicating that a packet configured of the header FIG. 14 and the data of FIG. 15 is common information (main compression coding information) among the frames. This packet is arranged in a vertical blanking period, and transmitted at least once for each image frame. The contents of the data of FIG. 15 will be described below.

Color_Sample denotes color sample information; for instance, 0 is a YCbCr luminance chromatic difference signal in the 444 format (hereinafter referred to as YCbCr444), 1, a YCbCr luminance chromatic difference signals in the 422 format (hereinafter referred to as YCbCr422), 2, a YCbCr luminance chromatic difference signals in the 420 format (hereinafter referred to as YCbCr420), 3, an RGB signal in the 444 format (hereinafter referred to as RGB444), and 4 through 7 for future expansion. To signals in the 422 format or the 420 format a bit indicating CbCr sample position information may as well be additionally allocated.

Eco_Mem is 0 when a packet transmitting some of main compression coding information shown in FIG. 16 and FIG. 17 is to be described afterwards to be transmitted in the horizontal blanking period immediately preceding the valid period 406 in which compressed image data is transmitted, and 1 when it is to be transmitted in the horizontal blanking period immediately following the valid period 406 in which compressed image data is transmitted.

CD denotes Color Depth; for instance, 4 h is a 24-bit Color, a total of 8 bits of YCbCr components, 5 h, a 30-bit Color, a total of 10 bits of YCbCr components, 6 h, a 36-bit Color, a total of 12 bits of YCbCr components, 7 h, a 48-bit Color, a total of 16 bits of YCbCr components, and the rest for future expansion. This definition conforms to the HDMI-prescribed Deep Color Mode definition.

Eco_FLM is supposed to be 1 when the compression coding formulas of all blocks in the frame are the same, and 0 when the formula is to be set block by block. Where it is 1, the compression coding formulas of Y, Cb and Cr are respectively stated in Eco-CD0, Eco-CD1 and Eco-CD2 to be described afterwards.

The ratio between CK_N and CK_M (CK_N/CMM) represents the frequency ratio between the pixel clock of uncompressed image data and the clock of the communication path for transmitting compressed data, for instance the TMDS clock. For instance, if CK_M=2 when CMN=1, the TMDS clock of the transmission system is 297 MHz, ½ of 594 MHz of the pixel clock of uncompressed image data at 4 k2 k.

Eco Block denotes the number of pixels constituting a compressed block.

Eco_CD0 through Eco_CD3 denote four kinds of candidates for compression coding information to be applied to individual image data unit blocks. As in one example shown in FIG. 18, the four kinds are selected from compression coding information Eco_Code for units of image data to be compressed.

One or more of packets, each including a header shown in FIG. 16 and data shown in FIG. 17, are transmitted in each horizontal blanking period. Eco_Packet # in the header shown in FIG. 16 denotes the serial number of the packet to be transmitted over each line, beginning with 1 and successively increased by 1 each time.

Eco_length_0 through Eco_length_39 represent size information on compressed blocks transmitted in the valid period 406. Examples of size information include the bit size and byte size of compressed blocks. It may as well be information on which the bit size and byte size of compressed blocks are based. For instance, there is a method by which, when a compressed block size S_Block takes on any value from 32 bits to 64 bits at two-bit intervals, the bit size of a compressed block is defined by the following equation.

$$S\_Block = 32 + (2 \times Eco\_length\_\#)$$
(# is 0 to 39)     (Mathematical expression 2)

In the example above, Eco_length # is four bits.

Eco_length_# may be defined individually for each of Y, Cb and Cr, or by a value which is the total compressed block size of Y, Cb and Cr. In the latter, the transmission quantity of Eco_length_# can be reduced to ⅓.

The compression coding information defined in compressed block units is transmitted as auxiliary compression coding information, together with compressed image data in the valid period 406. Types of the auxiliary compression coding information include Eco_Error_0 through 39 and Code_0 through Code_39.

Eco_Error_0 through Eco_Error_39 represent an error coding formula. The error coding formula is an error correction coding formula in the error correction code generator 136 for calculation regarding data transmitted in the valid period 406. Examples of error correction coding formula include the CRC (Cyclic Redundancy Check) formula and the parity check formula.

Code_0 through Code_39 state numbers selected from four types of compression coding information stated by Eco_CD0 through Eco_CD3 of FIG. 15 in the order of Y, Cb and Cr components in each image data unit block. For instance, if Code_0 representing the compression coding information on the Y component in the first image data unit block is 1, Eco_CD1 is indicated. If Eco_CD1 indicates 10, it means data obtained by compressing the 444 format Y component of the original image data from FIG. 18 by the differential coding formula.

When the two vertical lines shown in FIG. 4 are to constitute an image data unit block, Code_0 on the first line indicates compression coding information on the image data unit block 503, and Code_0 on the second line indicates compression coding information on the image data unit block 504.

When Color_Sample in FIG. 15 indicates the 444 format, Code_1 denotes compression coding information on Cb of a first image data unit block, Code_2 denotes compression coding information on Cr of the first image data unit, and Code_3 denotes compression coding information on Y of a second image data unit block. When Color_Sample indicates the 420 format, Code_1 denotes compression coding information on Y of the second image data unit block, Code_2 denotes compression coding information on Cb (Cr on even-number lines) of the first and second image data units, and Code_3 denotes compression coding information on Y of a third image data unit block. When Color_Sample indicates the 422 format, Code_1 denotes compression coding information on Cb of the first and second image data unit blocks, Code_2 denotes compression coding information on Y of the second image data unit, and Code_3 denotes compression coding information on Cb of the first and second image data unit blocks.

Further, when Code_0 indicates 0, it denotes Eco_CD0, or when Eco_CD0 indicates 6, it means that, as seen from FIG. 18, the 444 format Y, Cb and Cr components 12-bit data of the original image are curtailed to 8 bits of the 420 format. As Code_0 of only the Y component determines the transmission forms of Cb and Cr in this case, information of Code_1 indicating the Cb component and that of Code_2 indicating the Cr components are unnecessary, and 0 may be stated regarding them.

Now, though not shown in FIG. 1, the image receiving device 200 is mounted with a ROM storing EDID (Enhanced Extended Display Identification Data) manifesting the performance features of the image receiving device 200. Information to make possible determination of whether or not the image receiving device 200 is responsive to compression or expansion may be added into this ROM. This enables the image transmitting device 100 to read out of the ROM storing EDID of the image receiving device 200 information to determine whether or not it is responsive to compression or expansion and, if it is a responsive device, to transmit compressed image data or, if it is not a responsive device, to transmit the image in the usual size not compressed, thereby to keep compatibility also with an image receiving device not responsive to compression processing. Or if it is a device that reads out information to determine whether or not the device is responsive to an error correction coding formula for transmitting compression coding information in the valid period 406 and, if it is a responsive device, to process error correction coding and compression coding information or, if it is not a responsive device, to transmit the image in the usual size not compressed, thereby to keep compatibility also with an image receiving device not responsive to compression processing. Or if it is not a responsive device, resistivity to transmission errors may be enhanced by using the error correcting function of packets in the blanking period 407. Also, the user may be notified by indicating on the display section 208 that the image receiving device is not responsive to compression, the image is in the usual size and there is no responsiveness error correction coding.

Figures 19, 20:
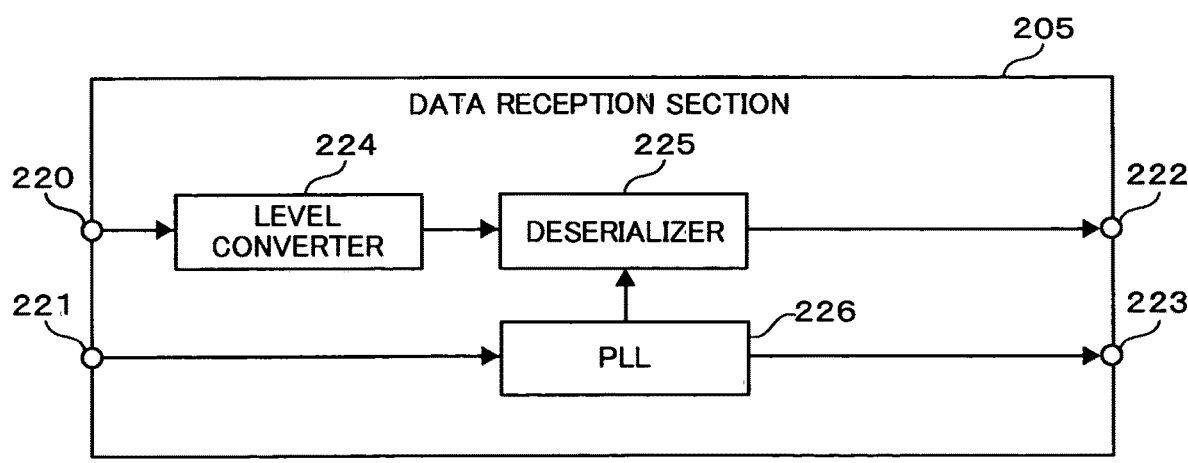
FIG. 19 shows one example of EDID statement of the image receiving device in the first embodiment.
FIG. 20 shows one example of data reception processor in the first embodiment.

An example of statement of this EDID is shown in FIG. 19. FIG. 19 shows an example of expansion into what is known as an HDMI-VSDB area.

At Bit 2 of Byte 6, an Eco_transfer flag is provided, which shows whether or not the device is responsive to the compressed coding transmission formula of this embodiment. As this area has been treated as a reserved area, it is stated as 0 in non-responsive legacy equipment, and only responsive equipment can maintain backward interchangeability by being stated as 1. Where this Eco_transfer flag is 1, statement of Byte 9 and Byte 10 is validated.

Block_64 and Block_128 are flags indicate that the respective sizes of image data unit blocks to be compressed are 64 pixels and 128 pixels. The image data unit block size of 32 pixels is defined as a required mode in responding to this compressed image data transmission, and its statement is intentionally dispensed with for the sake of saving the EDID stating space.

Eco-Codes 1 through 4 are flags indicating responsiveness to compressed coding formulas including the Wavelet conversion, run length encoding, Huffman encoding and differential encoding, whose respective examples are show in FIG. 18.

CLK_1, CLK3/4 and CLK1/2 are flags indicating responsiveness to modes in which the frequency of the TMDS transmission clock to 1/1, 3/4 and 1/2, respectively of the uncompressed image data clock.

Eco_Errors 1 through 4 are flags which take on 1 to indicate responsiveness to respectively prescribed error coding formulas or 0 to indicate non-responsiveness.

Eco_Mem takes on 1 when the main compression coding information is to be transmitted in the horizontal blanking period immediately preceding the valid period 406 in which compressed image data are to be transmitted, and takes on 2 when it is to be transmitted in the horizontal blanking period immediately following the valid period 406 in which compressed image data is to be transmitted. Numeral 3 indicates that it is responsive to both, and 0 indicates that it is responsive to neither.

Or where the image transmitting device 100 is to be used as mobile equipment, since it has to be battery-driven, power consumption of the image transmitting device 100 becomes a factor to influence the length of time it can be continuously used. In this case, power consumption can be reduced by compressing image data for transmission and thereby reducing the data transmission quantity. This effect makes possible setting of a long continuously usable period by adding, for instance, a function such as a "power saving mode" as an operating mode of the image transmitting device 100 and uncompressed image data when power is supplied from outside or transmitting compressed image data when the equipment is battery-driven.

FIG. 20 is a block diagram showing one example of configuration of the data reception processor 205.

An input section 220 outputs signals converted by a level converter 175 of the image transmitting device 100 to a level converter 22.

The level converter 224 converts signals converted in level by the image transmitting device 100 into digital signals, and outputs them to a deserializer 225. One example of level conversion is conversion of differential signals to single-end signals.

An input section 221 inputs a clock outputted from the image transmitting device 100 and outputs it to a PLL 226. The PLL 226 generates a clock 10 times the inputted clock, and outputs it to the deserializer 225. Further, the PLL 226 outputs from an output section 222 the pixel clock to be used in the image receiving device 200. When the pixel clock of uncompressed image data of the original image is used in an image display device 200, a clock resulting from (CK_M/CK_N) multiplication of the input clock by the PLL 226 on the basis of packet data in FIG. 13 is outputted from an output section 223.

The deserializer 225 parallelizes serialized data with a clock from the PLL 226 and outputs the parallelized data from the output section 222. The deserializer 225 parallelizes data of a tenfold clock, turns them into eight-bit parallel data by prescribed TMDS decoding or the like, and outputs them from the output section 222.

Figure 21:
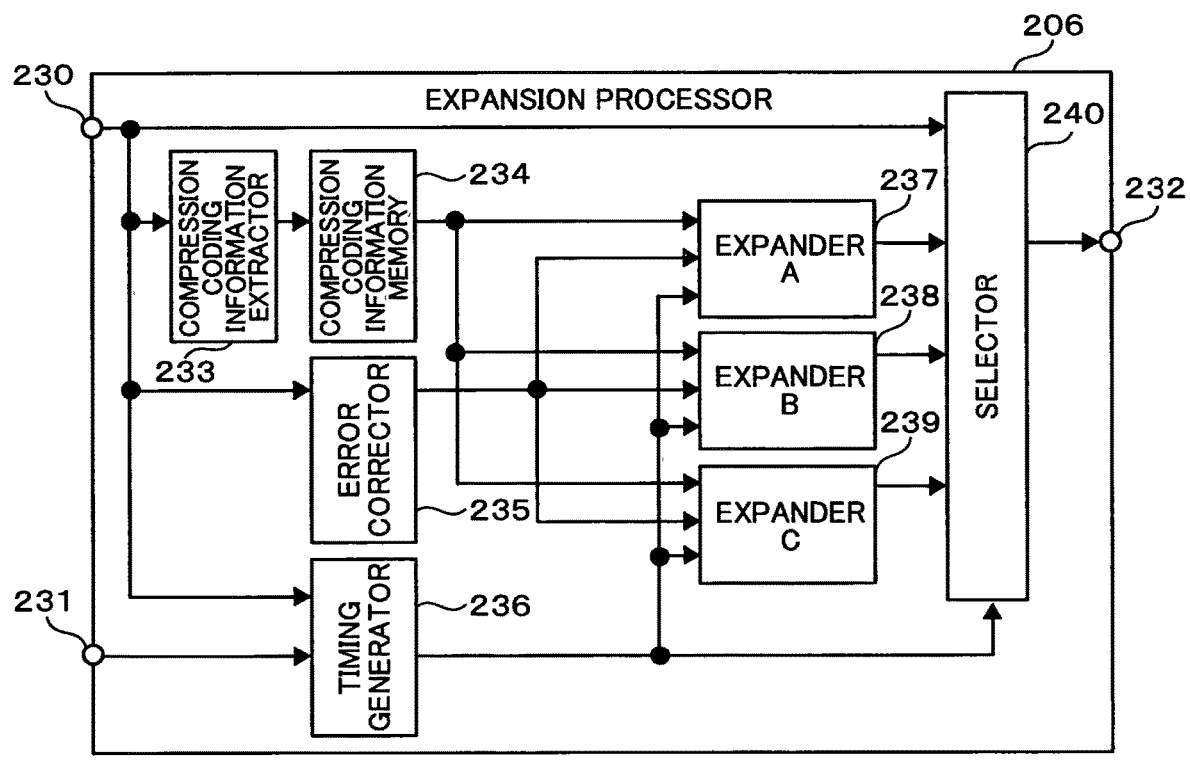
FIG. 21 shows one example of expansion processor in the first embodiment.

FIG. 21 is a block diagram showing one example of configuration of the expansion processor 206. Further, FIG.

Figure 26:
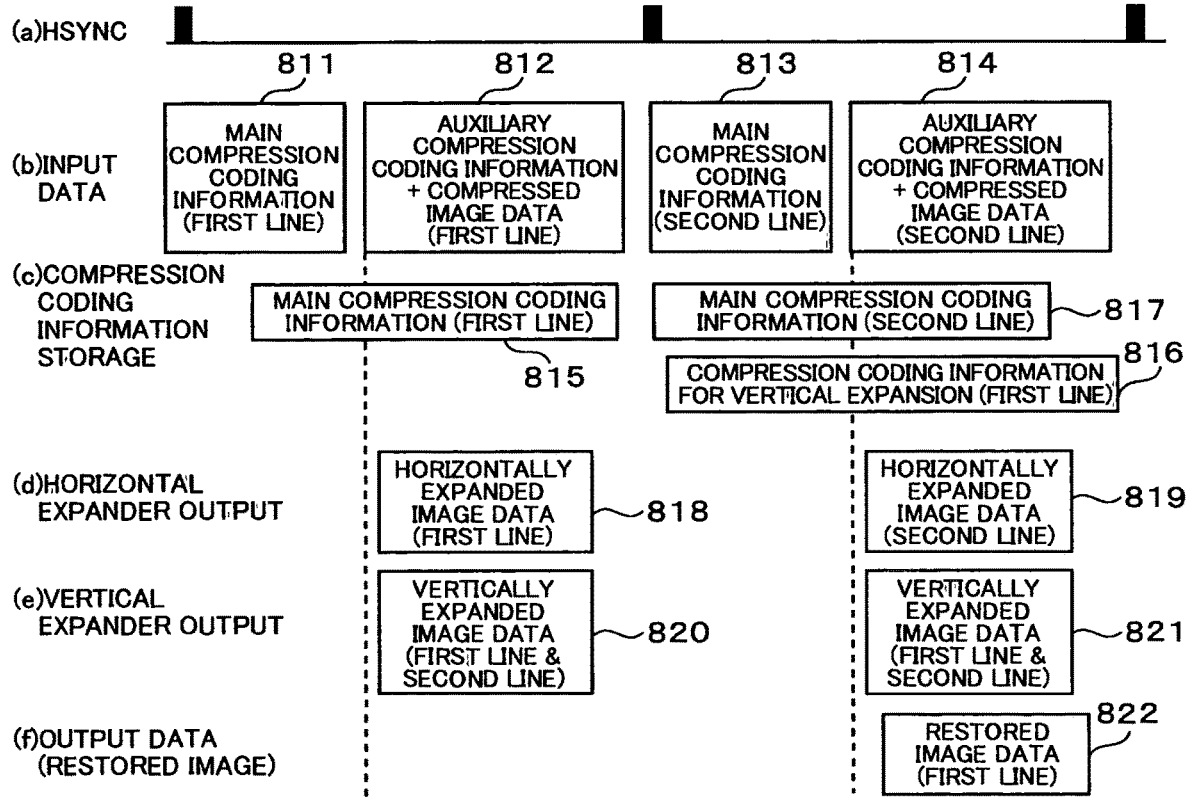
FIG. 26 shows another example of data transmission timing in the first embodiment.

26 is an explanatory drawing of timing illustrating the processing concept of the expansion processor 206 regarding the compressed block shown in FIG. 4. An input section 230 is a data input section of the expansion processor 206. Data inputted to the input section 230 includes HSYNC (FIG. 26 (a)) and VSYNC indicating sync signals of image data, compressed image data and auxiliary compression coding information sets 812 and 814 in the valid period 406, and main compression coding information sets 811 and 813 in the horizontal blanking period 404. To an input section 231, the pixel clock of uncompressed image data after restoration, a compressed image data clock and the like are inputted.

HSYNC, VSYNC, compressed image data clock and the pixel clock of uncompressed image data after restoration are supplied to a timing generator 236. The timing generator 236 controls a counter with inputted HSYNC and VSYNC, and generates and outputs timings needed for the control of blocks in the expansion processor including timings for the vertical blanking period 401, the vertical valid period 402, the horizontal blanking period 404, the horizontal valid period 405 and the valid period 406.

A compression coding information extractor 233 extracts compression coding information on each image data unit block sent in horizontal blanking periods, and stores it into a compression coding information memory 234.

The period of this storage is shown in FIG. 26(c). Since the main compression coding information set 811 is data matching the compressed image data set 812 that follows, a period 815 of storing the information until the second-line main compression coding information 813 arrives is sufficient. However, where two lines of image data are vertically compressed for instance, at least compression coding information 816 for vertical expansion has to be held until the period of expand the second-line compressed image data.

Compressed image data arriving within the horizontal valid period undergo correction of errors in the transmission system by an error corrector 235. The error corrector 235 calculates for each unit of compressed image data the same error correction code as what the error correction code generator 137 does. The result of this calculation and an error correction code inputted from the compression coding information extractor 233 are compared and, if the result of comparison indicates any difference, error correction is processed. One example of error correction processing is CRC operation. Or, only error detection may be done, leaving interpolation for errors to be done in subsequent processing.

The inputted compressed image data are supplied to an expander A237, an expander B238 and an expander C239.

The expander A237, expander B238 and expander C239 processes expansion of the compressed image data each in a different way on the basis of information in the compression coding information memory 234 to generate expanded image data, and outputs them to a selector 261.

FIGS. 26(d) and 26(e) respectively show output data of each expander when the compressed blocks shown in FIG. 4 are processed for horizontal expansion by the expander A237 and processed for vertical expansion by the expander B238. Horizontally expanded image data 818 and 819 represent the output data of the expander A237, and the vertically expanded image data 820 and 821 represent the output data of the expander B237.

The selector 261 appropriately selects, on the basis of information in the compression coding information memory 234, image data to be inputted to the input section 230, the output of the expander A237, the output of the expander B238 and the output of the expander C239, and outputs the selected data to an output section 232 as restored image data 824 (FIG. 26(f)).

Figure 25:
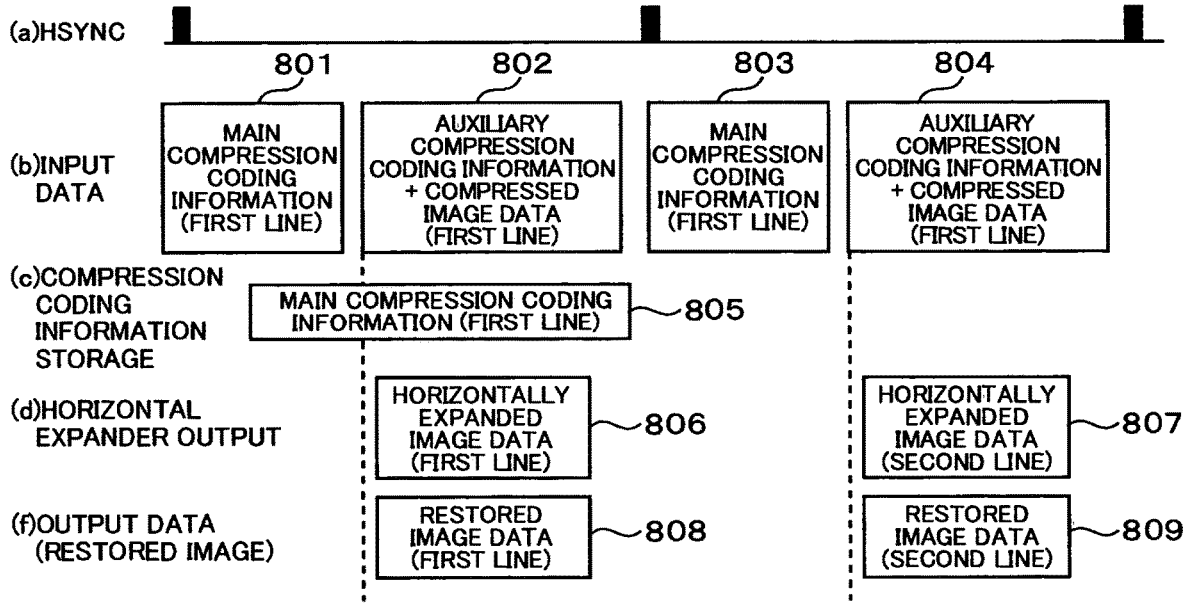
FIG. 25 shows one example of data transmission timing in the first embodiment.

FIG. 25 is an explanatory drawing of timing illustrating the processing concept of the expansion processor 206 when the compressed block shown in FIG. 3 is processed for horizontal expansion by the expander A237.

The input section 230 is a data input section of the expansion processor 206. The data sets inputted to the input section 230 include HSYNC (FIG. 26(a)) and VSYNC indicating sync signals of image data, compressed image data 802 and auxiliary compression coding information 804 in the valid period 406, and main compression coding information sets 801 and 803 in the horizontal blanking period 404. To the input section 231, the pixel clock of uncompressed image data, compressed image data clock and the like after restoration are inputted.

The compression coding information extractor 233 extracts compression coding information on each image data unit block arriving in a horizontal blanking period, and stores it into the compression coding information memory 234.

The period of that storage is shown in FIG. 25(c). Since the main compression coding information 801 is a data set matching the compressed image data 802 that follows, a storage period 805 for the information until the arrival of the second line of the main compression coding information 803 will be long enough.

The inputted compressed image data is horizontally expanded by the expander A237 to generate horizontally expanded image data sets 806 and 807, which are expanded image data and outputted to the selector 261 (FIG. 25(d)).

The selector 261 appropriately selects, on the basis of information in the compression coding information memory 234, image data to be inputted to the input section 230, the output of the expander A237, the output of the expander B238 and the output of the expander C239, and outputs the selected data to the output section 232 as restored image data sets 808 and 809 (FIG. 25(f)).

Figure 22:
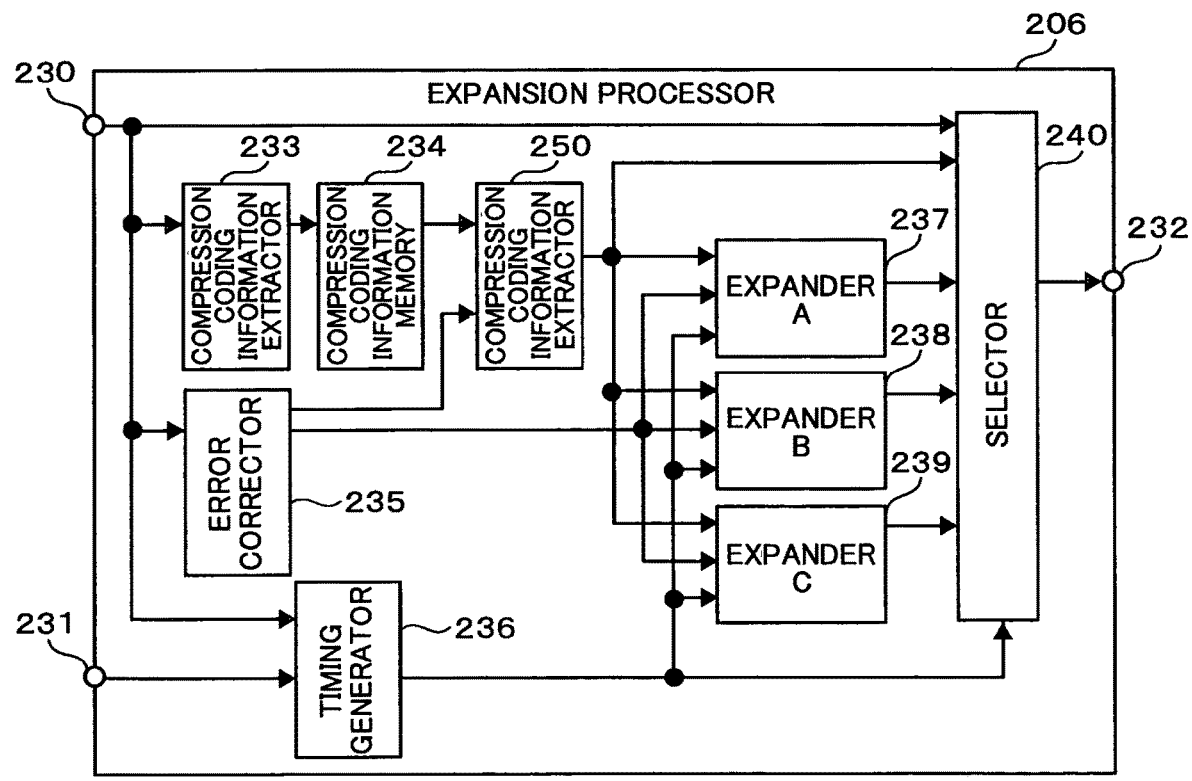
FIG. 22 shows another example of expansion processor in the first embodiment.

FIG. 22 is a block diagram showing one example of configuration of the expansion processor 206. This example is an expansion processor for which a formula of transmitting auxiliary compression coding information is transmitted, together with compressed image data in the valid period 406, instead of in the horizontal blanking period 404.

When the data to be transmitted in the valid period 406 is not only compressed image data but also includes compression coding information, some compression formula may require a reduction of the compression rate of the compressed image data, and in such a case the picture quality of restored images may deteriorate substantially. To prevent this deterioration, the horizontal blanking period is shortened to a length just enough for transmission of two audio data transmission packets and the horizontal valid period can be extended correspondingly. When 4 k2 k image data of an uncompressed image is to be transmitted at a 297-MHz clock, half the 594 MHz of the pixel clock, it was 1920 for the horizontal valid period and 280 for the horizontal blanking period in Embodiment 1. For the transmission period of two audio packets, including guard bands before and after, 96 will be sufficient for the horizontal blanking period, and according the horizontal valid period can be extended by the remaining 184. There is an effect of permitting extension of 1920 of the horizontal valid period by about 95%.

In this case, as the position and width of the horizontal sync signal deviates from the standard timing of the prescribed uncompressed image data, it is advisable to so restore, with reference to uncompressed image data SVDC (Short Video Descriptor) metadata assigned to the image data, the timing as to conform to the standard timing format on the receiving side.

In FIG. 22, blocks having similar functions to their counterparts in FIG. 21 are assigned respectively the same reference numbers. The difference is the addition of a second image coding information extractor 250 to the output section of an error correcting circuit 255.

In the example of FIG. 21, the compression coding information extractor 233 extracts compression coding information (packets in FIG. 14 and FIG. 15) in the vertical blanking period and compression coding information (packets in FIG. 16 and FIG. 17) in the horizontal blanking period. In this example, the compression coding information extractor 233 extracts only the main compression coding information to be transmitted in vertical blanking period or the horizontal blanking period, and stores it into the compression coding information memory 234.

In this example, instead of transmitting compression coding information in a packet processed for error correction in the blanking period, error correction similar to that for other compressed image data sets is processed. As a result, the main compression coding information processed for error correction by the error corrector 255 and outputted from the second compression coding information extractor 250 and the auxiliary compression coding information outputted from the compression coding information memory 234 are outputted to the expander A237, the expander B238, the expander C239 and a selector 251.

In this example, since the compressed image data and the compression coding information are close to each other in timing, storage of compression coding information over one horizontal period is unnecessary except for common compression coding information within the frame, resulting in an effect of permitting a reduction in circuit dimensions.

Figure 23:
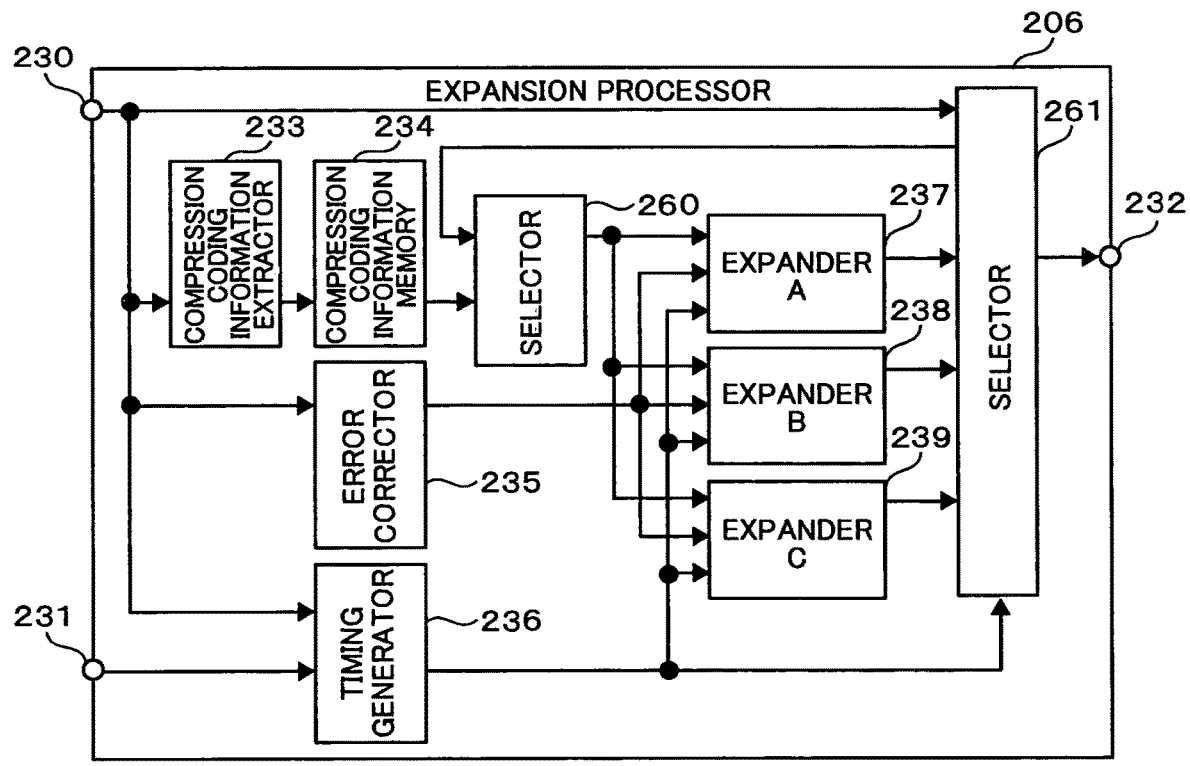
FIG. 23 shows another example of expansion processor in the first embodiment.

FIG. 23 is a block diagram showing another example of configuration of the expansion processor 206.

In FIG. 23, blocks having similar functions to their counterparts in FIG. 21 are assigned respectively the same reference numbers. The difference is the addition of a selector 260 at a stage preceding the expanders.

The selector 261 appropriately selects, on the basis of information in the compression coding information memory 234, image data inputted to the input section 230 output, the output of the expander A237, the output of the expander B238 and the output of the expander C239, and outputs the selected data to the output section 232. The selector 261 can further select any of the output of the expander A237, the output of the expander B238 and the output of the expander C239, and output the selected one to the selector 260. By adopting the formula of this configuration, extension by two or more formulas can be processed for compressed image data inputted to the input section 230.

Though not shown, any of the output of the expander A237, the output of the expander B238 and the output of the expander C239 can be selected, and the selected one can be outputted to the compression coding information memory 234. The use of this configuration enables, for instance, compressed auxiliary compression coding information 660 in FIG. 5 to be processed for expansion.

Figure 24:
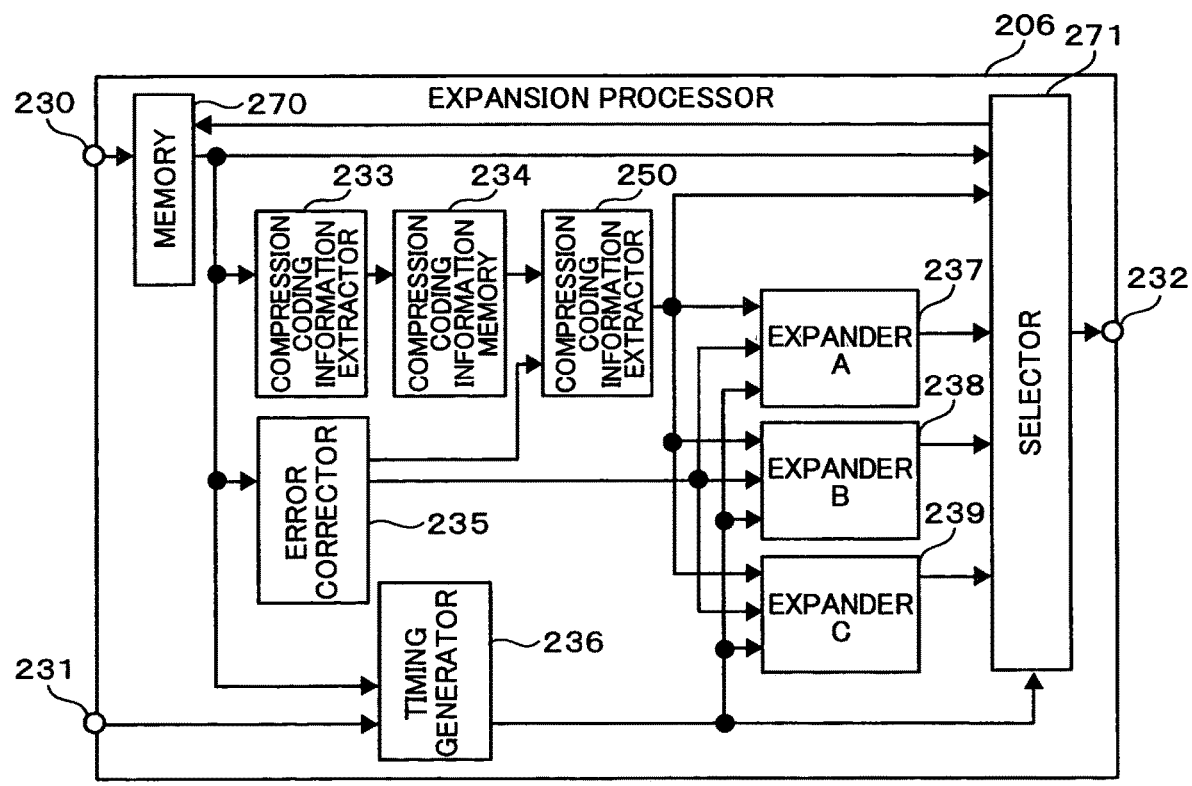
FIG. 24 shows another example of expansion processor in the first embodiment.

FIG. 24 is a block diagram showing still another example of configuration of the expansion processor 206. In FIG. 24, blocks having similar functions to their counterparts in FIG. 22 are assigned respectively the same reference numbers. The difference is the addition of a memory 270 at the stage following the input section 230.

A selector 271 has a function to output selected data the memory 270 in addition to the functions of the selector 251 shown in FIG. 22. The memory 270 is a block that temporarily stores main compression coding information, auxiliary compression coding information and compressed image data inputted from the input section 230 and expanded data supplied from the selector 271, and supplies them to blocks of following stages. By using this configuration, expansion of data inputted to the input section 230 can be processed at a plurality of stages. If only one stage of expansion processing is needed, data supply from the selector 271 to the memory 270 can be dispensed with.

The use of this configuration enables, for instance, expansion of image data compressed by the method shown in FIG. 8 or FIG. 11 to be processed.

Embodiment 2

Another mode of realizing the image transmission device and the image receiving device described as Embodiment 1 will be described below.

Figure 29:
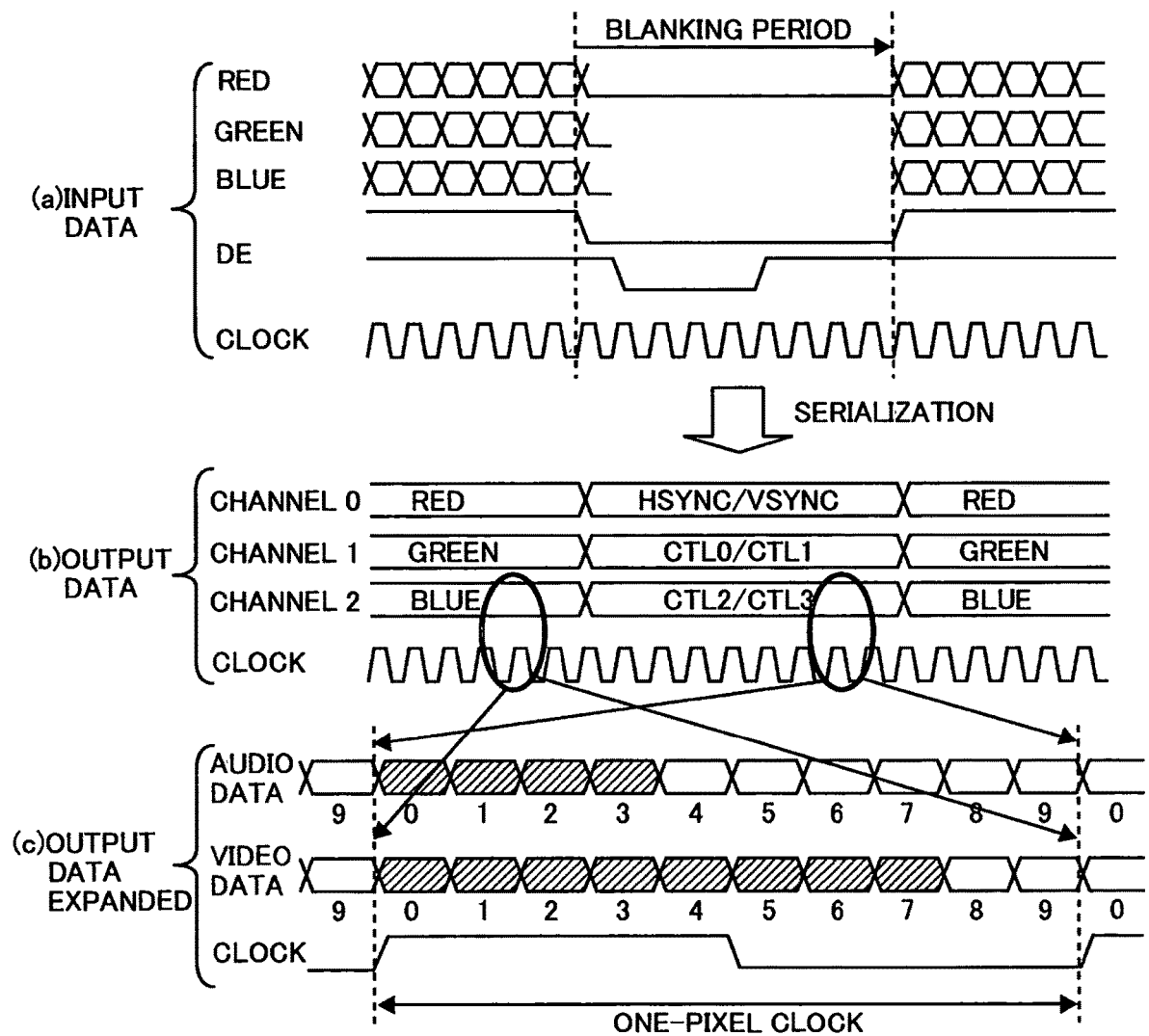
FIG. 29 shows one example of waveform of a serializer in a second embodiment.

FIG. 29 shows one example of input and output waveforms of the serializer 184. The serializer 184 serializes compressed image data corresponding to image data of inputted YCbCr luminance chromatic difference signals (hereinafter referred to as YCbCr image data) or image data of RGB signals (hereinafter referred to as RGB image data) with a tenfold multiplied clock into three one-bit data sets, and output them to the level converter 175.

In one example of serialization, image data of eight-bit YCbCr luminance chromatic difference signals or RGB signals is outputted in the order of MSB or LSB from the beginning with a tenfold multiplied clock.

The level converter 185 outputs signals converted into a standard data transmission format via the output section 182. Examples of standard data transmission format include a differential level signal form of the TMDS formula. In a blanking period of images in this form, since transmission of no image data is needed, strength against transmission errors is increased in transmitting data other than image data by using only four-bit parts of the data of the tenfold multiplied clock to be serialized by the serializer 184 and not using the remaining six bits. Further, by using the two kinds of clocks, clocks generated by the PLL 186 can be reduced to ½ of the clock for transmitting image data to obtain the same effect.

FIG. 30 shows one example of data composition of the serializer 184. There are three output lines of the serializer 184, of which one is configured of sync signals (HSYNC and VSYNC), a packet head and fixed bits. The configuration is such that the remaining two lines are used for transmitting data. The packet size is a 32-cycle equivalent of the transmission clock.

Figure 31:
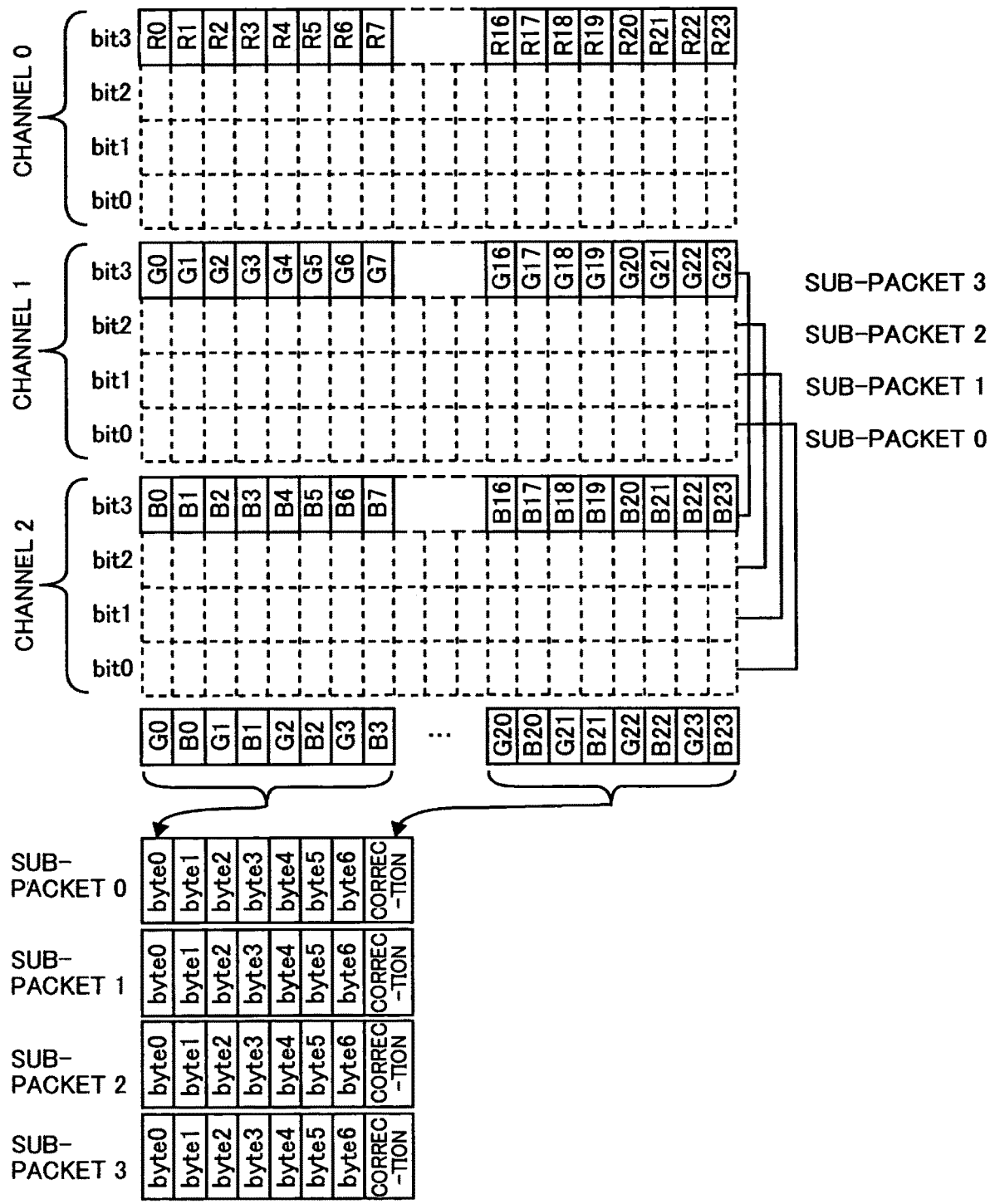
FIG. 31 shows one example of packet composition of audio data in the second embodiment.

FIG. 31 shows one example of data composition of audio data superposed in a horizontal blanking period. In the audio packet, sub-packets are configured generating seven-byte data with the same bits for two lines of data to be transmitted to the serializer and attaching an error correcting code, such as a parity check, to the data. A packet for the horizontal blanking period is configured in a format of four lines of the sub-packets and four bytes of a packet header.

As this configuration includes an error correcting code for sub-packet data, an error occurring on the transmission path can be corrected to increase error resistivity. Further, as data for transmitting sub-packet data are configured in a zigzag form on two physically different channels, an error arising in a burst-like way does not affect the other channel, data error can be corrected. The error correction rate is high enough for an improving effect of $10^{-14}$ in the horizontal blanking period against $10^{-9}$ in the horizontal valid period.

It is advisable to transmit the error correction code of compressed images as the highly error-resistive packet. The following description will take up as an example of number of transmittable packets a case in which the number of pixels in the horizontal period is 2200 and that of pixels in the horizontal valid period is 1920. To add, the example of image form is YCbCr422.

Assuming the size of images to be compressed to be 64 pixels (32 luminance pixels and 32 chromatic difference pixels), the size of 60 error correction codes (2-byte) will require 120 bytes.

As the available capacity permits transmitting 28 bytes per packet, five packets will be a large enough size for the transmission. As the horizontal blanking period has 280 pixels, eight packets can be superposed. This configuration allows, even if a maximum of two packets are provided for audio packets as 192 kHz 8ch LPCM audio transmitting, transmission of a maximum of five packets of the error correction code in the horizontal period.

When compressed image data of inputted RGB image data are to be outputted to the data transmission section 115 in compressed block units over respectively prescribed TMDS channels, periods in which no compressed image data are transmitted occurs between compressed blocks. Considered on a line-by-line basis, there is a problem that no substantial reduction of horizontal valid periods, compared with no compression is done.

Figure 32:
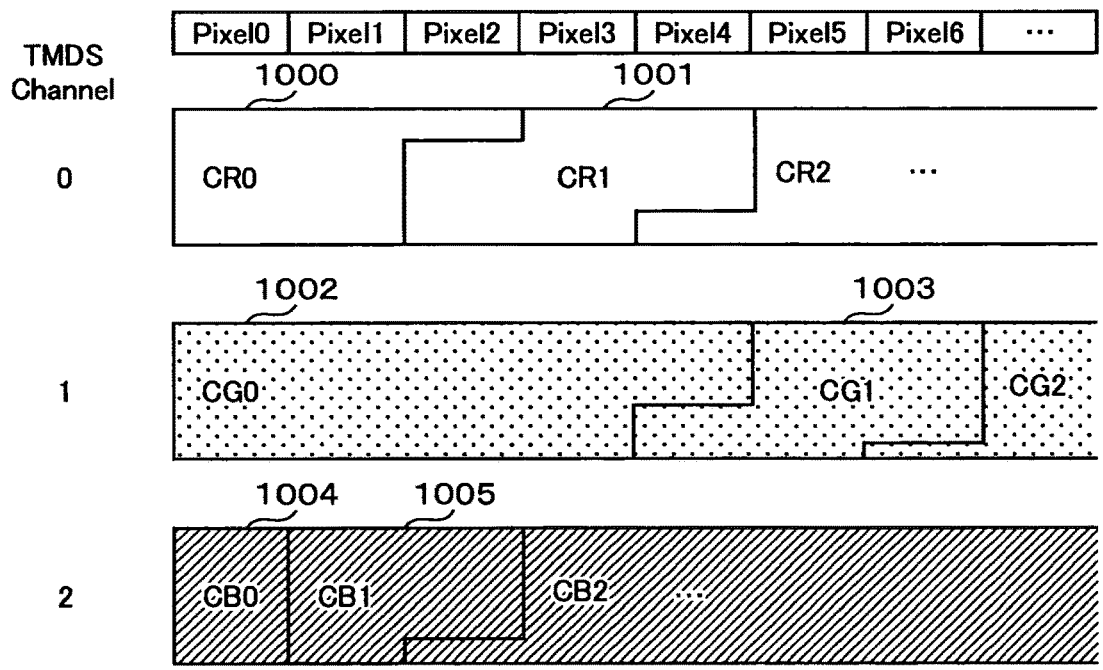
FIG. 32 shows one example of bit allocation to various components of compressed image data on a transmission path in the second embodiment.

FIG. 32 shows one example of output waveforms on each of TMDS channel 0, TMDS channel 1 and TMDS channel 2 when compressed image data of inputted RGB image data is to be outputted to the data transmission section 115.

The following description concerns a case in which compression is processed for each of R, G and B components of RGB image data in this embodiment and R compressed image data, G compressed image data and B compressed image data are generated. CR0 and CR1 in the drawing are compressed image data in sub-compression blocks, and a compressed block is configured of CR0 and CR1. CR2 is the leading sub-block of the next compressed block. The same applies CG0, CG1, CG2, CB0, CB1 and CB2 as what applies to CR0, CR1 and CR2 mentioned above.

In this embodiment, it is made possible to reduce the non-transmission period for compressed image data between compressed blocks and sub-compression blocks by transmitting R compressed image data clammed in bit units and transmitting them over TMDS channel 0.

Figure 35:
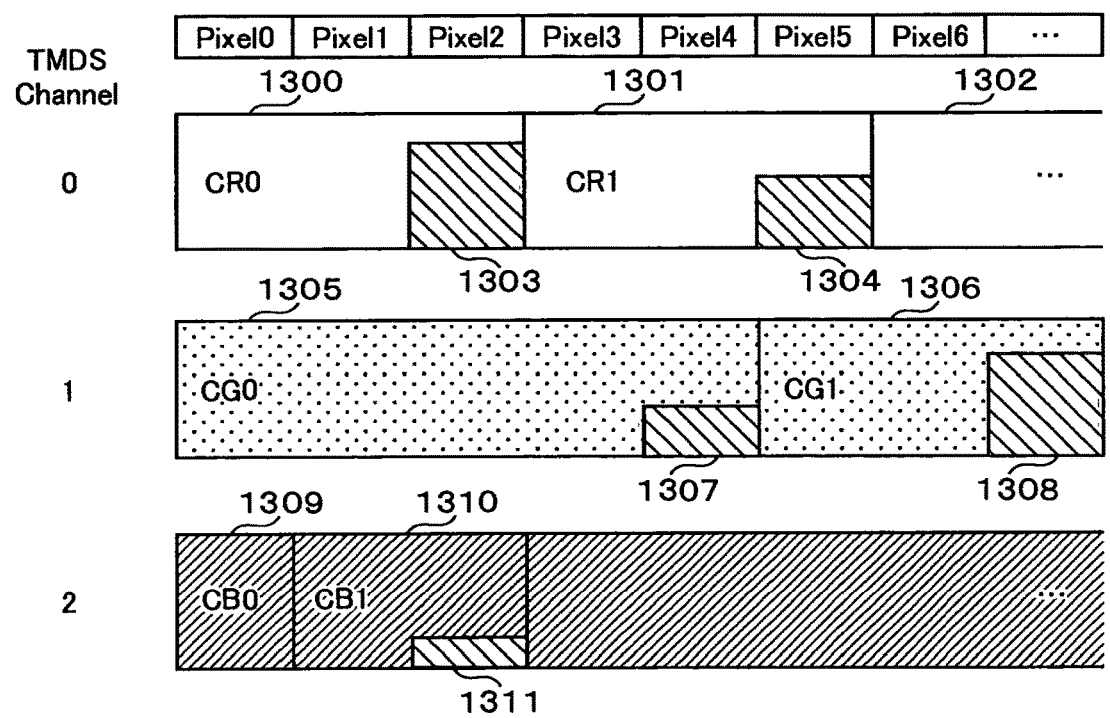
FIG. 35 shows another example of bit allocation to various components of compressed image data on the transmission path in the second embodiment.

FIG. 35 shows another example of output waveforms on each of TMDS channel 0, TMDS channel 1 and TMDS channel 2 when compressed image data of inputted RGB image data is to be outputted to the data transmission section 115.

In this embodiment, where sub-compression blocks 1300, 1301, 1302, 1305, 1306, 1309 and 1310 cannot be divided into even numbers by 8 bits, the leading bit of any sub-compression block is caused to be positioned always as the leading bit of a channel by adding stuffing data sets 1303, 1304, 1307, 1308 and 1311 at the end. In this way, the receiving circuit for sub-compression blocks on the image receiving device side can be simplified. Although stuffing data is added in sub-compression block units in this example, the addition may as well be done in compressed block units as shown in FIG. 36.

The examples of this embodiment described with reference to FIG. 32 and FIG. 35 involve a problem the transmission band occupied by transmitted compressed image data is limited to the TMDS channel on which the compressed data quantity is the greatest, entailing elongation of the valid period, because compressed image data corresponding to RGB image data inputted to the data transmission section 115 is outputted to respectively prescribed TMDS channels.

Figure 33:
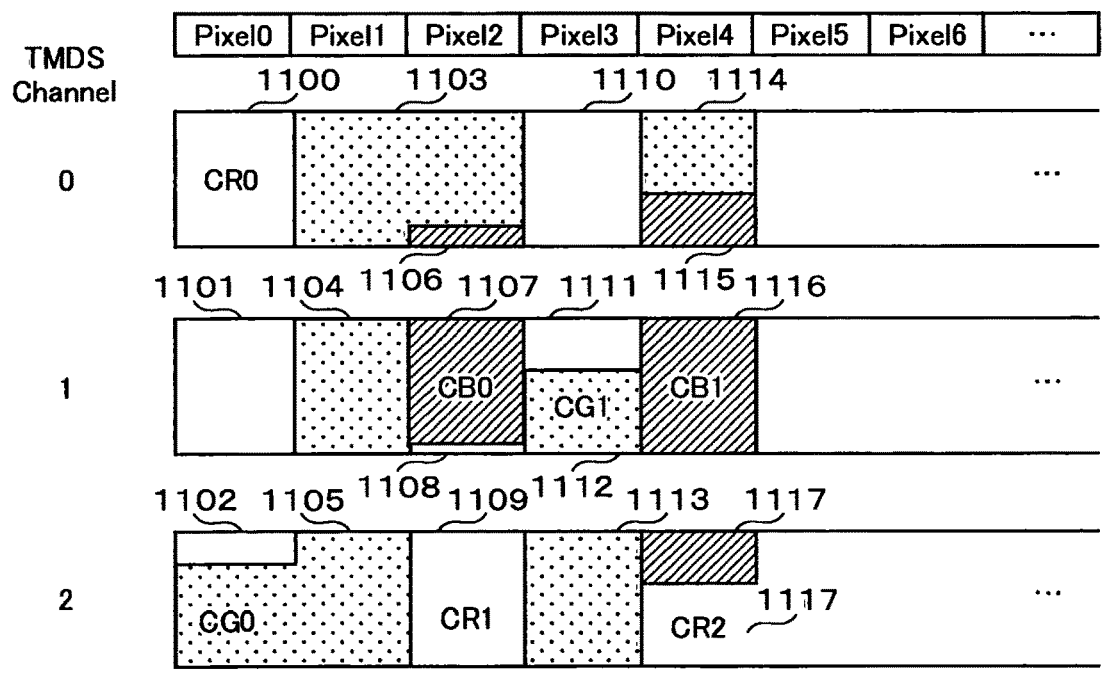
FIG. 33 shows another example of bit allocation to various components of compressed image data on a transmission path in the second embodiment.

FIG. 33 shows another example of output waveforms on each of TMDS channel 0, TMDS channel 1 and TMDS channel 2 when R compressed image data, G compressed image data and B compressed image data, which are components of compressed image data of inputted RGB image data, are to be outputted to the data transmission section 115.

In this embodiment, R compressed image data, G compressed image data and B compressed image data are successively outputted in this order in sub-compression block units to TMDS channel 0, TMDS channel 1 and TMDS channel 2 successively in an interleaved way. Here is taken up, by way of example, a case in which R compressed image data CR0 is in 18 bits, G compressed image data CG0 in 37 bits, B compressed image data CB0 in 8 bits, R compressed image data CR1 in 20 bits, G compressed image data CG1 in 18 bits and B compressed image data CB1 in 14 bits.

Figure 34:
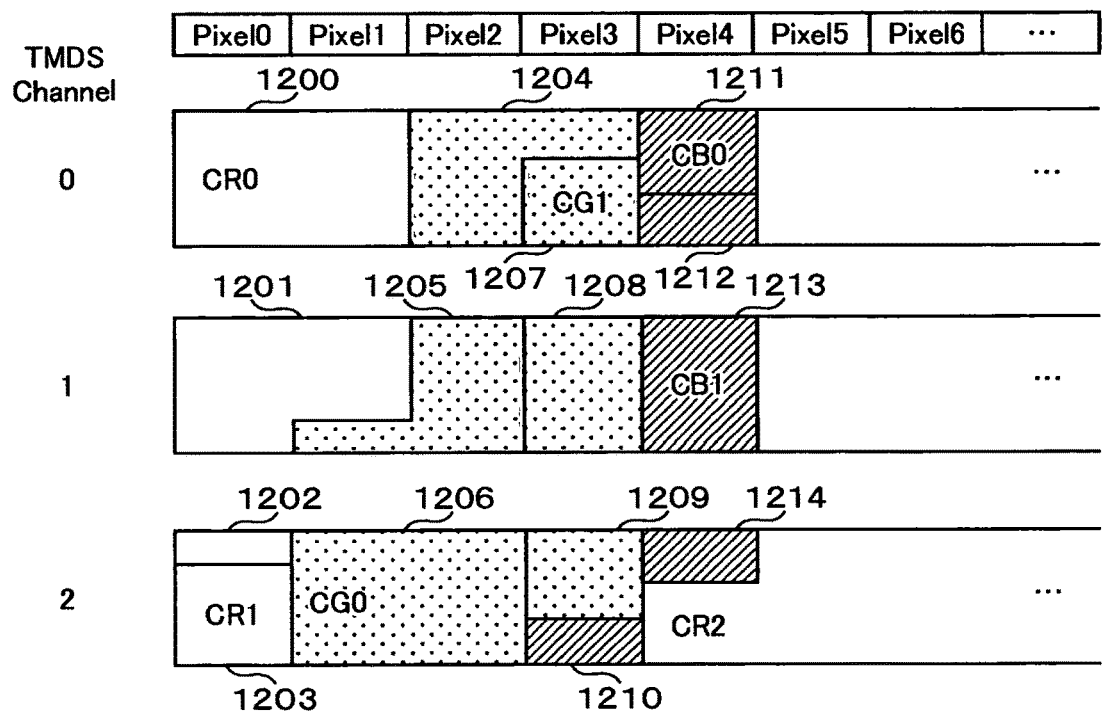
FIG. 34 shows another example of bit allocation to various components of compressed image data on the transmission path in the second embodiment.

As the use of the above-described output formula enables compressed image data corresponding to RGB image data inputted to the data transmission section 115 to be transmitted over the three TMDS channels in an evenly shared way, the valid periods for transmitting compressed image data can be shortened. Although outputting in this case is done in sub-compression block units in the order of RGB, it may as well be done in compressed block units as shown in FIG. 34.

Figure 37:
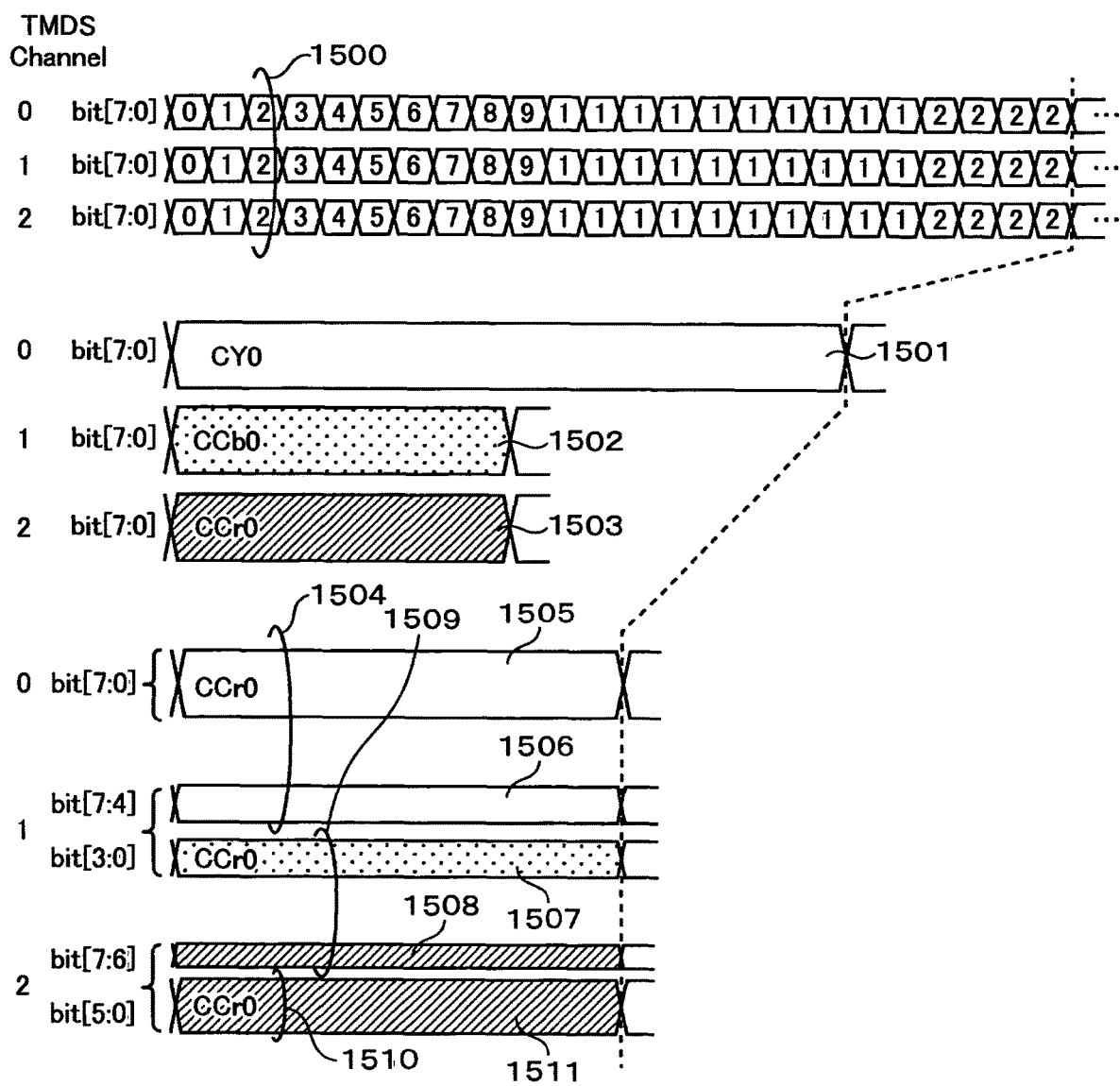
FIG. 37 shows another example of bit allocation to various components of compressed image data on the transmission path in the second embodiment.

FIG. 37 shows still another example of output waveforms on each of TMDS channel 0, TMDS channel 1 and TMDS channel 2 when compressed image data of YCbCr444 image data to be inputted to the data transmission section 115 are to be outputted. The proportions of data quantities of the components of YCbCr444 image data are the same among Y image data, Cb image data and Cr image data. Incidentally, the proportions of data quantities of the components of YCbCr422 image data are 1 each for Cb image data and Cr image data against 2 of Y image data.

Reference numeral 1500 denotes image data inputted to the compression processor 114. Reference numerals 1501, 1502 and 1503 respectively denote Y compressed image data (luminance-compressed image data), Cb compressed image data (Cb chromatic difference-compressed image data) and Cr compressed image data (Cr chromatic difference-compressed image data), which are components of compressed image data generated by compression of Y image data, Cb image data and Cr image data.

Because of the characteristic of human vision that is more sensitive to luminance (Y) components than to chromatic difference (Cb and Cr) components, it is possible to make the data quantity of compressed image data of Cb components (hereinafter referred to as Cb compressed image data) and the data quantity of compressed image data of Cr components (hereinafter referred to as Cr compressed image data) smaller than the data quantity of compressed image data of Y components (hereinafter referred to as Y compressed image data) by setting the compression rate of Y components higher than the compression rates of Cb components and Cr components.

This embodiment represents one example of compression processing of image data higher in priority of transmission among different components of image data at a higher compression rate.

More specifically, the level of priority of Y compressed image data higher in those of Cb compressed image data and Cr compressed image data and, as the width of output bit from the data transmission section 115, 12 bits are allocated to Y compressed image data, 6 bits to Cb compressed image data, and 6 bits to Cr compressed image data.

When Y compressed image data 1501, Cb compressed image data 1502 and Cr compressed image data 1503 are to be outputted to TMDS channel 0 (8 bits/cycle), TMDS channel 1 (8 bits/cycle) and TMDS channel 2 (8 bits/cycle), respectively, the transmission bands occupied by the transmitted compressed image data is limited to the TMDS channel 0 on which the compressed data quantity is the greatest, entailing elongation of the valid period.

Reference numerals 1505, 1506, 1507, 1508 and 1511 denote one example of output data where more channels (12 bits/cycle) are allocated to Y compressed image data than to Cb compressed image data (6 bits/cycle) and Cr compressed image data (6 bits/cycle). The use of this output formula enables the valid period for transmitting compressed image data to be shortened.

To add, allocation of output bit width is instructed from the controller 110 to the data transmission section 115. Or the data transmission section 115 may allocate in advance at predetermined rates of distribution according to an image format (for instance YCbCr444 or the like) instructed from the controller. The rates of distribution may be set by the controller 115.

Whereas this embodiment has been described with respect to a case in which the image data are YCbCr444, for other image signals such as RGB signal, too, the level of transmission priority may be given to each individual compressed image data set, and the bit width of outputting to an output transmission path (for instance TMDS channel 0, 1 or 2). For example where the image data is RGB signals, there is a method by which the level of transmission priority for G components can be set higher than for the levels of transmission priority for R components and B components. More specifically, there is a method by which 12 bits are allocated as bit width of outputting to G components, and 6 bits each are allocated as bit width of outputting to R components and B components.

Further, as another case of the level of transmission priority in which the image data are YCbCr444, there is a method by which a level of transmission priority higher the other chromatic difference components is allocated to 4:2:2 components. More specifically, it is a method by which 20 bits are allocated as the output bit width for 4:2:2 and 4 bits each are allocated as the output bit width for the remaining Cb components and Cr components.

FIG. 38 shows another example of output waveforms in which inputted Y compressed image data 1601 is outputted to the data transmission section 115, and Cb compressed image data 1602 and Cr compressed image data 1603 are outputted to TMDS channel 0, TMDS channel 1 and TMDS channel 2. To add, 1600 denotes image data to be input to the compression processor 114.

Regarding this embodiment, a case in which bit 4, bit 5, bit 6 and bit 7 of TMDS channel 0 and bit 0, bit 1, bit 6 and bit 7 of TMDS channel 1 are lower in transmission error rate than other bits.

Reference numerals 1604, 1605, 1606, 1607, 1608 and 1609 denote examples of output data where Y compressed image data is allocated to bits lower in transmission error rate on TMDS channel. The use of this output formula enables the error occurrence rate of Y compressed image data to be brought down.

To add, in this embodiment Cb compressed image data is allocated to 1602, 1605 and 1607, and Cr compressed image data is allocated to 1603 and 1609.

Further, information on the transmission error rate is supplied from the controller 110 to the data transmission section 115. Or, on the basis of the transmission error rate, the controller may designate bit allocation of Y compressed image data, Cb compressed image data and Cr compressed image data to TMDS channels. Although YCbCr luminance chromatic difference signals have been taken up as an example in the description of this embodiment, in other image forms including RGB signals as well, a level of priority may be assigned to each compressed image data set in bit allocation to TMDS channels.

Further, the level of transmission priority of each component may be represented by the compression rate of each component. In this case, a greater output bit width shall be allocated to components of a higher compression rate and a smaller output bit width shall be allocated to components of a lower compression rate. For instance, there is a method by which the compression rates of different components (Y, Cb and Cr) of YCbCr444 are respectively set to 80%, 40% and 40%, the levels of transmission priority are respectively set to 2, 1 and 1, or another method by which the output bit widths of different components (Y, Cb and Cr) are respectively set to 12 bits, 6 bits and 6 bits.

Embodiment 3

Another mode of realizing the image transmission device and the image receiving device described as Embodiment 1 will be described below.

In this embodiment, main compression coding information is transmitted in a packet area in the horizontal blanking period 406 shown in FIG. 30. It does not take on a packet structure in spite of using the packet area, and four-bit data are supposed to be transmitted on each channel. Further, auxiliary compression coding information 1740 is transmitted in the valid period.

Figure 39:
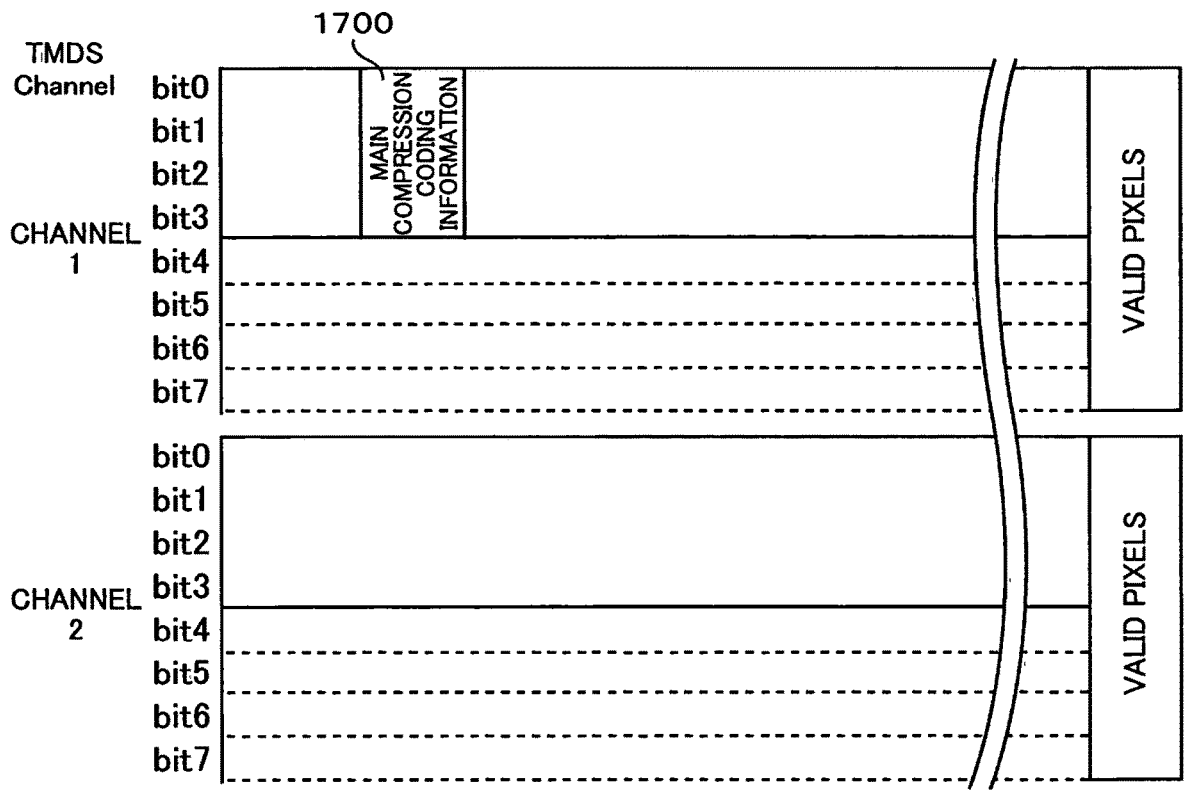
FIG. 39 shows one example of data composition of main compression coding information in a third embodiment when no redundancy level is added.

FIG. 39 shows one example of output data composition of the data transmission section 115 when main compression coding information 1700 is to be transmitted in the horizontal blanking period 406.

The use of this configuration can enhance error resistivity in transmitting the main compression coding information 1700 compared with transmitting in the valid period. However, transmitting over a transmission path of a high transmission error rate poses a problem of how to further enhance error resistivity.

Figure 40:
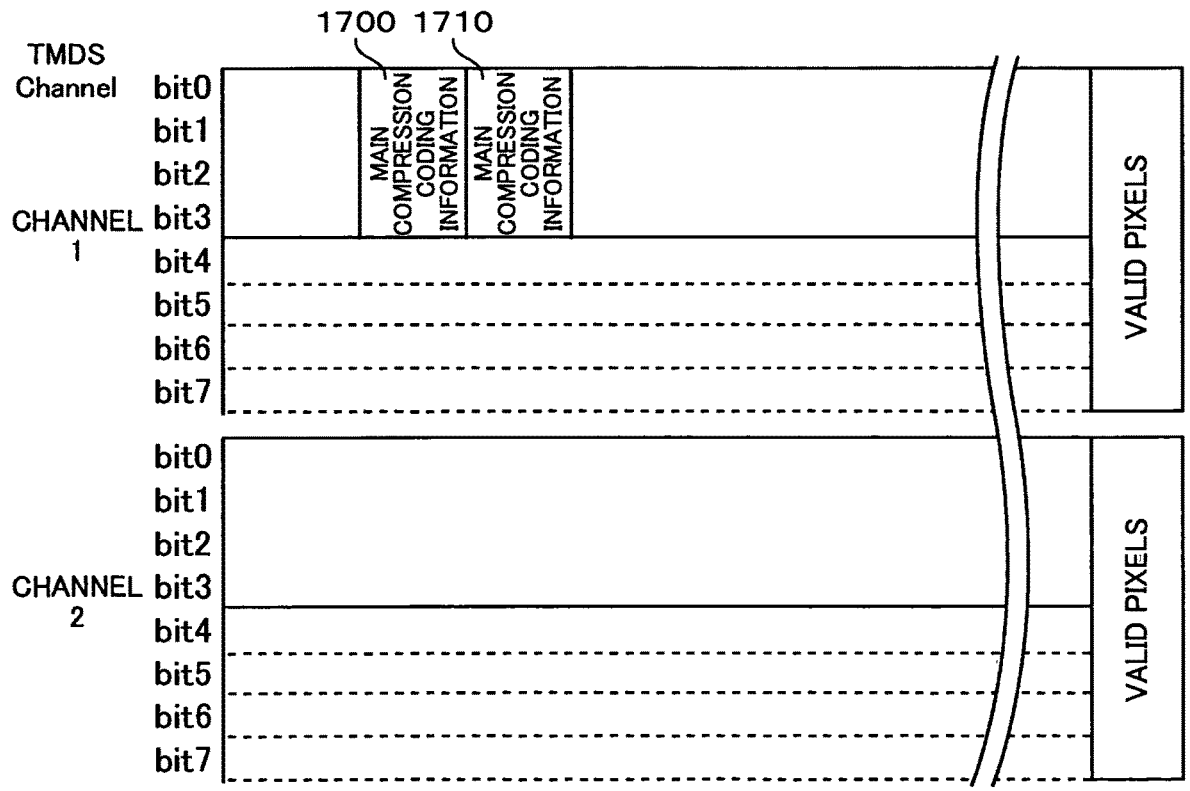
FIG. 40 shows one example of data composition of main compression coding information in the third embodiment when a redundancy level is added.

FIG. 40 shows one example in which main compression coding information 1710, which is the same as the main compression coding information 1700, is to be transmitted in a horizontal blanking period over the same transmission path. In this embodiment, the main compression coding information 1710 is outputted immediately after the main compression coding information 1700. To add, the main compression coding information 1710 need not immediately follow the main compression coding information 1700. The use of this configuration serves to enhance the redundancy of the main compression coding information, and makes it possible to provide main compression coding information with high transmission error resistivity even over a transmission path whose transmission error rate is high. To add, the redundancy level in this embodiment means the number of main compression coding information sets transmitted additionally. In this embodiment, the redundancy level is supposed to be 1.

Figure 41:
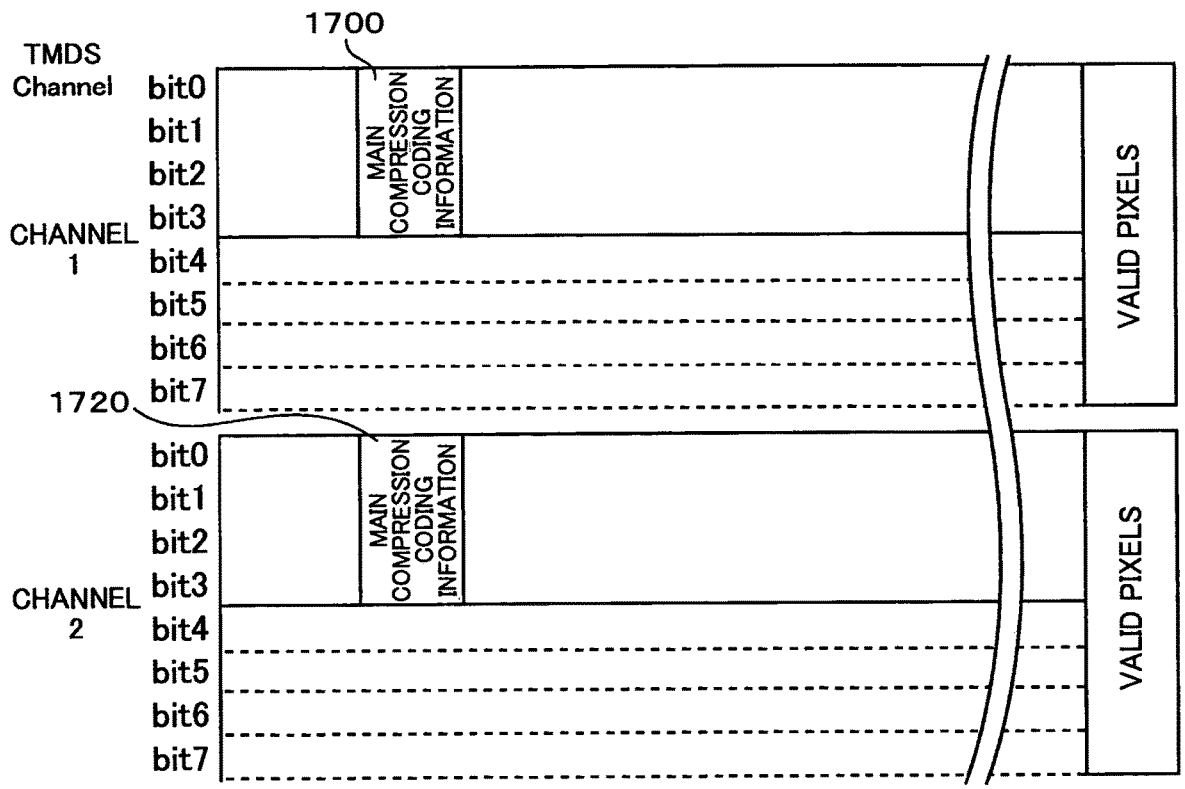
FIG. 41 shows another example of data composition of main compression coding information in the third embodiment when the redundancy level is added.

FIG. 41 shows one example in which main compression coding information 1720, which is the same as the main compression coding information 1700, is to be transmitted in a horizontal blanking period over a different transmission path. In this embodiment, a drop in transmission error resistivity due to transmission error rate fluctuations from channel to channel is restrained by transmitting the main compression coding information 1720 over a different channel than one for the main compression coding information 1700.

For instance, if the transmission error rate on channel 0 is higher than the transmission error rate on channel 1, allocation of redundant main compression coding information on channel 0 as shown in FIG. 40 would invite a drop in error resistivity, but transmitting the same main compression coding information sets over a plurality of channels as shown in FIG. 41 enables error occurrence rates of main compression coding information to be evened up. In this embodiment, two main compression coding information sets allocated to each channel, but they may as well be allocated to bit. For instance, there is a method to allocate the main compression coding information 1700 to bit 0 and bit 1 of channel 0 and bit 0 and bit 1 of channel 1 and allocate the main compression coding information 1700 to bit 2 and bit 3 of channel 0 and bit 2 and bit 3 of channel 1. Also, bit allocation may be changed in accordance with information on the transmission error rate.

Figure 42:
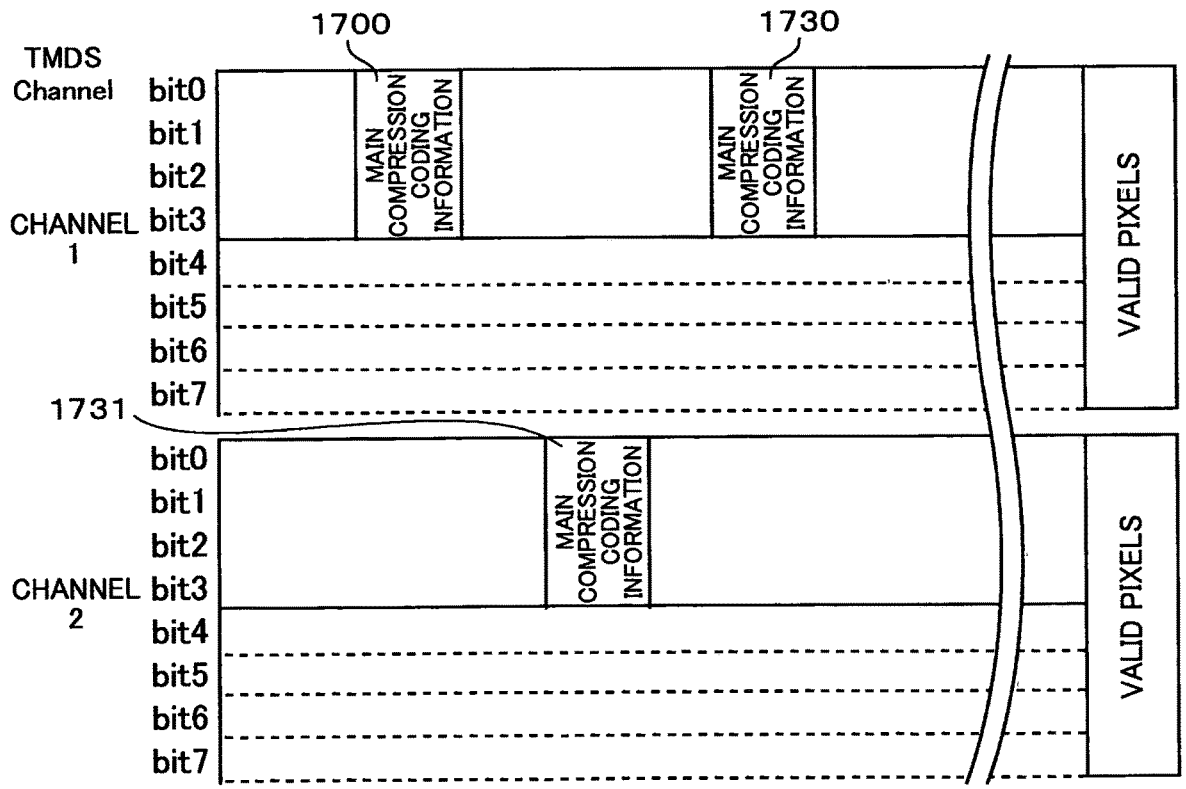
FIG. 42 shows another example of data composition of main compression coding information in the third embodiment when the redundancy level is added.

FIG. 42 shows an example in which the redundancy level is raised to 2 from the embodiments shown in FIG. 40 and FIG. 41. The main compression coding information 1700 and main compression coding information 1730 and main compression coding information 1731, both the same as the main compression coding information 1700, are outputted.

The resistivity of the transmission path to errors may as well be enhanced by raising the redundancy level of main compression coding information according to the transmission error rate.

FIG. 43 shows a case in which the redundancy level is raised to 2 from the embodiments shown in FIG. 40 and FIG. 41. The main compression coding information 1700 and main compression coding information 1730 and main compression coding information 1731, both the same as the main compression coding information 1700, are outputted.

The redundancy level of main compression coding information may be raised according to the transmission error rate.

Whereas transmitting of redundant main compression coding information when main compression coding information is to be transmitted in a horizontal blanking period has been described so far, where auxiliary compression coded images are to be transmitted in a valid period, the error resistivity of auxiliary compression coding information may as well be enhanced by transmitting redundant auxiliary compression coding information, which is the same as the auxiliary compression coding information, in a valid period.

FIG. 43 shows one example of output data composition of the data transmission section 115 in a case in which, where auxiliary compression coding information is to be transmitted in a valid period, the redundancy level of the auxiliary compression coding information is set to 2.

The use of this configuration can strengthen error resistivity when auxiliary compression coding information 1740 is to be transmitted.

The redundancy level of main compression coding information may as well be raised according to the transmission error rate.

Embodiment 4

In Embodiment 3, whereas the redundancy level of main compression coding information or auxiliary compression coding information is raised according to the transmission error rate, there is a problem that the transmission capacity of the transmission path over which additional redundant compression coding information is to be transmitted is limited.

Therefore Embodiment 4 adopts a formula that allows an increase in the transmission capacity of the transmission path over which redundant compression coding information is to be transmitted by shortening the compression rate or the compression formula and lengthening or shortening the horizontal blanking period according to the transmission error rate.

Instructions to increase/decrease the compression rate, compression formula and horizontal blanking period and information on the redundancy level of compression coding information are supplied from the controller 110 to the compression processor 114 and the data transmission section 115.

There is a method to convey by EIDI or CEC communication information on the situation of responses on the image receiving device side to instructions to increase/decrease the compression rate, compression formula and horizontal blanking period and to the redundancy level of compression coding information from the image receiving device to the image transmitting device. Decisions regarding instructions to increase/decrease the compression rate, compression formula and horizontal blanking period and the redundancy level of compression coding information in response to the transmission error rate may be made either by the controller 110 or individually by the compression processor 114 or the data transmission section 115.

FIG. 44 shows a case in which the transmission error rate is divided into three ranges and one example of compression rate, horizontal blanking period and redundancy level in each range. When a transmission error rate ER surpasses ERa (when the transmission error rate is high), the compression rate is set to 40%, the quantity of generated compressed image data is reduced, the horizontal blanking period is shortened, and the valid period is extended. The transmittable quantity of auxiliary compression coding information to be transmitted in the valid period can be thereby increased. In this embodiment, the resistivity of auxiliary compression coding information to transmission errors is enhanced by setting the redundancy level of auxiliary compression coding information to 2 and transmitting two sets of redundant auxiliary compression coding information of the same contents as the auxiliary compression coding information in the valid period.

When the transmission error rate ER is at or below ERb (when the transmission error rate is low), images of high picture quality are made transmittable by setting the compression rate to 80% and increasing the quantity of generated compressed image data. The period in which no data are transmitted is increased by refraining from insertion of redundant compression coding information. The period in which no data is transmitted is the total of neither compressed image data nor auxiliary compression coding information is transmitted in the valid period 406 and neither packets nor main compression coding information is transmitted in the blanking period period 407. Power saving is made possible by stopping the clock or taking actions at a frequency lower than the clock frequency in this non-transmission period.

When the transmission error rate ER is above ERb but not above ERa (when the transmission error rate is normal), it is attempted not only to raise the transmission error resistivity but also to enhance the picture quality by setting the compression rate to 60% and the redundancy level of auxiliary compression coding information to 1.

FIG. 45 shows a case in which the transmission error rate is divided into three ranges and another example of compression rate, horizontal blanking period and redundancy level in each range. When a transmission error rate ER surpasses ERa (when the transmission error rate is high), the compression rate is set to 40%, the quantity of generated compressed image data is reduced, the horizontal blanking period is extended, and the horizontal period is extended. The transmittable quantity of main compression coding information to be transmitted in the horizontal blanking period can be thereby increased. In this embodiment, the resistivity of auxiliary compression coding information and main compression coding information to transmission errors is enhanced by setting the redundancy level of auxiliary compression coding information to 1 and transmitting one set of redundant auxiliary compression coding information of the same contents as the auxiliary compression coding information in the valid period, setting the redundancy level of main compression coding information to 1, and transmitting one set of main compression coding information in the horizontal blanking period.

In addition, the compression rate described with reference to FIG. 44 and FIG. 45, the compression formula may as well be altered. FIG. 46 shows a case in which the transmission error rate is divided into three ranges and one example of compression formula, horizontal blanking period and redundancy level in each range. The compression formula is changed over among formula A, formula B and formula C with the transmission error rate ER. When the transmission error rate ER is above Ra, resistivity to transmission errors can be enhanced by using a compression formula that involves less main compression coding information and can raise the redundancy level. Also, by applying a compression formula that can be expected to provide a high compression rate (for instance the compression rate of 40% in FIG. 45), it is made possible to increase the transmittable quantity of auxiliary compression coding information or main compression coding information.

Whereas the compression rate was taken up as an example in the description referring to FIG. 44 and FIG. 45, and the compression formula was taken up in the description referring to FIG. 46, both the compression rate and the compression formula may as well be switched over according to the transmission error rate.

Although this embodiment has been described with reference to a case in which redundant main compression coding information or redundant auxiliary compression coding information is outputted to enhance resistivity to transmission errors, the error coding formula may as well be switched over according to the transmission error rate. Or where the transmission error rate is high, in addition to reducing the quantity of compressed image data after compression as shown in FIG. 45, resistivity to transmission errors can be enhanced by extending the horizontal blanking period and transmitting part of the auxiliary compression coding information in the horizontal blanking period.

With respect to this embodiment, a method to reduce compressed image data by processing compression at a low compression rate where the transmission error rate is higher than a prescribed level, a method to reduce compressed image data by processing compression by using a compression formula suitable for a low compression rate, a method to increase the transmission capacity of the transmission path for main compression coding information by extending the horizontal blanking period, or a method to increase the transmission capacity of the transmission path for auxiliary compression coding information by extending the valid period 406, but a method to reduce the number of audio packets transmitted in the horizontal blanking period by audio data may be used as well.

Examples of method to reduce audio data include a change from uncompressed audio form to compressed audio form and the number of audio channels from six to two.

Embodiment 5

Whereas the compression rate, horizontal blanking period and redundancy level are increased according to the transmission error rate in Embodiment 4, there is a problem that picture quality and error resistivity in relation to the transmission error rate are determined irrespective of the type of contents of image data. In this embodiment, picture quality and transmission error resistivity suitable for the type of contents can be secured by altering the compression rate, horizontal blanking period and redundancy level according to the type of contents. To add, though the transmission error rate was not touched on in the description of this embodiment, this embodiment may further include switching over according to the transmission error rate.

FIG. 47 shows one example of formula to switch over the compression rate, horizontal blanking period and redundancy level according to the type of contents. In this embodiment, where the contents are a cinematograph, the compression rate is set to 80%, the horizontal blanking period is extended, the redundancy level of main compression coding information is set to 2, and the redundancy level of auxiliary compression coding information is set to 1 to enhance the picture quality and error resistivity. On the other hand, where the contents are Japanese checker/Japanese chess, error resistivity is enhanced by shortening the horizontal blanking period, setting the redundancy level of main compression coding information to 1, and setting the redundancy level of auxiliary compression coding information to 1 while the compression rate is set to 40%, on account of the characteristic that there are many static parts.

Of where the contents are sports, it is considered that visual sensitivity to errors is low though the images involve many moving parts and are difficult to compress, the horizontal blanking period is shortened and the redundancy level of both main compression coding information and auxiliary compression coding information is set to 0, namely no redundant compression coding information is inserted while setting the compression rate to 80%, thereby to increase non-transmission periods for data while seeking higher picture quality.

Embodiment 6

In Embodiment 4, where the transmission error rate is below its prescribed level, picture quality enhancement was sought by increasing the quantity of compressed image data at a high compression rate. Regarding this embodiment, one example of method to enhance sound quality when the transmission error rate is below its prescribed level will be described with reference to FIG. 48.

Reference numerals 1800 and 1802 denote the valid period 406 in which compressed image data or auxiliary compression coding information is transmitted, and 1801 denotes the blanking period 407 in which main compression coding information or audio packets audio packets are transmitted. Reference numeral 1810 denotes image data before compression. Reference numerals 1820, 1821 and 1822 concern one example in which main compression coding information 1820 and an audio packet 1821 are transmitted in a blanking period 1801 and auxiliary compression coding information or compressed image data 1822 are transmitted in a valid period 1802. In this case, the number of audio packets transmittable within the blanking period 1801 is limited by the transmitted quantity of the main compression coding information 1820.

Here, when the transmission error rate is below its prescribed level, main compression coding information 1830 may also be transmitted in the valid period 1802. In this case, high sound quality can be achieved by allocating more audio packets to the blanking period.

Although error resistivity is higher in the blanking period than in the valid period, the transmittable data quantity is ⅓ or less if the transmission error rate is below its prescribed level.

FIG. 49 shows another example of formula to realize high sound quality. Reference numerals 1910, 1911 and 1912 concern one example of transmitting main compression coding information 1910, audio packet 1911, auxiliary compression coding information and compressed image data 1912 when the valid period is not extended. In this example, there is no vacancy in which the main compression coding information 1910 can be transmitted in the valid period.

Then, when the transmission error rate is below its prescribed level, a formula is chosen according to which the valid period is extended and main compression coding information 1921 is transmitted in this extended valid period 1902. The main compression coding information 1921, auxiliary compression coding information and compressed image data 1922 may be arranged anywhere if only it is within the extended valid period 1902. In the case of this formula, since the transmittable data quantity in the valid period 1902 is three times that in the blanking period or even more, the extended length of the valid period is 3/1 or less of the transmission period of the main compression coding information in the blanking period. Therefore, as denoted by 1920, the blanking period in which audio packets can be transmitted can be extended. By increasing the audio data quantity, sound quality can be enhanced. Examples of sound quality enhancement features include an increased number of channels, audio signal generation at a higher sound frequency, audio signal generation with larger quantized bits, and relaxation of band limitations in high and low ranges.

This embodiment so far described enables image data of a larger size than the currently prescribed image size to be transmitted over the currently prescribed transmission path by transmitting in a compressed form the image data to be transmitted by the image transmission device, and moreover it is possible to transmit compressed images having higher error resistivity by transmitting main compression coding information, which is part of compression coding information in an area made more error-resistive than the transmission area of image data.

Also, when image data of the currently prescribed image size is to be transmitted, the data transmission quantity per prescribed length of time or the data transmission clock can be lowered, the frequency of error occurrence can be brought down and, moreover, a system highly reliable against errors on the transmission path can be architected.

Further, a system that can deal with errors in such a manner that picture quality deterioration due to an error is kept from being conspicuous even if the error arises on the transmission path and the error cannot be perfectly corrected.

REFERENCE SIGNS LIST

100 . . . Image transmission device
101 . . . Input section
102 . . . Input section
103 . . . Input section
104 . . . Input section
105 . . . Tuner reception processor
106 . . . Network reception processor
107 . . . Recording medium controller
108 . . . Recording medium
109 . . . User IF
110 . . . Controller
111 . . . Stream controller
112 . . . Decoder section
113 . . . Display processor
114 . . . Compression processor
115 . . . Data transmission section
116 . . . Output section
191 . . . Data path
192 . . . Data path
193 . . . Data path
200 . . . Image receiving device
201 . . . Input section
202 . . . Input section
203 . . . User IF
204 . . . Controller
205 . . . Data reception processor
206 . . . Expansion processor
207 . . . Display processor
208 . . . Display section
300 . . . Cable

The invention claimed is:

1. An image transmission device that divides a two-dimensional image including the number of horizontal valid pixels and the number of vertical valid lines into unit blocks smaller than the two-dimensional image and transmits compressed image data compressed for each unit block to an image receiving device, the image transmission device comprising:
   a transmission section that transmits the compressed image data and compressed coding information;
   a compression processor that compresses the two-dimensional image to the compressed image data; and
   a reading section that reads performance information from the image receiving device,
   wherein the performance information includes horizontal size candidate information of the unit block,
   wherein the compression processor decides the unit block horizontal size based on the horizontal size candidate information of the unit block and compresses the two-dimensional image on the basis of the unit block horizontal size,
   wherein the compressed coding information includes the unit block horizontal size information; and
   the transmission section transmits the compressed coding information in blanking period.

2. The image transmission device according to claim 1, wherein the compressed coding information includes cyclic redundancy check codes.

3. The image transmission device according to claim 1, wherein the performance information further includes vertical size candidate information of the unit block, wherein the compression processor decides the unit block vertical size based on the vertical size candidate information of the unit block, and wherein the compression coding information further includes the unit block vertical size information.

4. The image transmission device according to claim 1, wherein the transmission section has a further ability to transmit un-compressed image data regarding to the two-dimensional image.

* * * * *